US011101862B2

(12) United States Patent
Venugopal et al.

(10) Patent No.: US 11,101,862 B2
(45) Date of Patent: Aug. 24, 2021

(54) BEAM UPDATE TECHNIQUES IN WIRELESS COMMUNICATIONS

(71) Applicant: QUALCOMM Incorporated, San Diego, CA (US)

(72) Inventors: Kiran Venugopal, Raritan, NJ (US); Tianyang Bai, Bridgewater, NJ (US); Jung Ho Ryu, Fort Lee, NJ (US); Tao Luo, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/823,233

(22) Filed: Mar. 18, 2020

(65) Prior Publication Data

US 2020/0304186 A1   Sep. 24, 2020

Related U.S. Application Data

(60) Provisional application No. 62/822,587, filed on Mar. 22, 2019.

(51) Int. Cl.
*H04B 7/06* (2006.01)
*H04L 5/00* (2006.01)

(52) U.S. Cl.
CPC ......... *H04B 7/0617* (2013.01); *H04B 7/0608* (2013.01); *H04B 7/0626* (2013.01); *H04B 7/0695* (2013.01); *H04L 5/0048* (2013.01)

(58) Field of Classification Search
CPC .. H04B 7/0617; H04B 7/0608; H04B 7/0626; H04B 7/0695; H04L 5/0048
See application file for complete search history.

(56) References Cited

U.S. PATENT DOCUMENTS

| 9,191,090 | B2 * | 11/2015 | Avudainayagam ... H04L 25/022 |
| 9,318,805 | B2 * | 4/2016 | Jia .......................... H04L 1/0027 |
| 10,291,378 | B1 * | 5/2019 | Bai .................... H04W 72/0413 |
| 10,523,300 | B2 * | 12/2019 | Malik .................. H04B 7/0689 |
| 10,554,262 | B2 * | 2/2020 | John Wilson ........ H04B 7/0413 |

(Continued)

OTHER PUBLICATIONS

International Search Report and Written Opinion—PCT/US2020/023628—ISA/EPO—dated Jul. 13, 2020.

(Continued)

*Primary Examiner* — James M Perez
(74) *Attorney, Agent, or Firm* — QUALCOMM Incorporated

(57) ABSTRACT

Methods, systems, and devices for wireless communications are described that provide efficient beam updates in beamformed communications between a transmitting device and receiving device. The transmitting device and the receiving device may establish a connection using one or more beamformed transmission beams. The devices may periodically perform beam refinement procedures or beam training procedures and may update the transmission beams used for communications based on such procedures. Signaling to indicate the updated transmission beams may be transmitted that indicates one or more of a difference or delta from a prior beamforming parameter, a beam that was used at the receiving device for one or more measurements of a reference signal from the transmitting device, or any combinations thereof.

30 Claims, 24 Drawing Sheets

(56) References Cited

U.S. PATENT DOCUMENTS

| | | | | |
|---|---|---|---|---|
| 10,716,013 | B2* | 7/2020 | Malik | H04W 16/28 |
| 10,797,846 | B2* | 10/2020 | Bai | H04L 5/0053 |
| 10,812,231 | B2* | 10/2020 | Chen | H04B 7/0486 |
| 10,862,562 | B2* | 12/2020 | Malik | H04B 7/063 |
| 10,863,366 | B2* | 12/2020 | Nagaraja | H04B 7/086 |
| 10,893,540 | B2* | 1/2021 | Akkarakaran | H04W 74/006 |
| 10,917,159 | B2* | 2/2021 | Gao | H04B 7/088 |
| 10,944,455 | B2* | 3/2021 | John Wilson | H04B 7/0626 |
| 10,992,350 | B2* | 4/2021 | John Wilson | H04B 7/0408 |
| 11,018,742 | B2* | 5/2021 | John Wilson | H04B 7/0634 |
| 2015/0117329 | A1* | 4/2015 | Avudainayagam | H04B 7/0842 370/329 |
| 2017/0288743 | A1* | 10/2017 | Nam | H04L 5/0035 |
| 2017/0302341 | A1* | 10/2017 | Yu | H04W 72/0446 |
| 2017/0331577 | A1* | 11/2017 | Parkvall | H04J 11/0079 |
| 2018/0034531 | A1* | 2/2018 | Sadiq | H04W 72/046 |
| 2018/0083680 | A1* | 3/2018 | Guo | H04L 5/0048 |
| 2018/0102826 | A1* | 4/2018 | Raghavan | H04B 7/0621 |
| 2018/0206132 | A1* | 7/2018 | Guo | H04B 7/02 |
| 2018/0219606 | A1* | 8/2018 | Ng | H04L 5/0053 |
| 2018/0234959 | A1* | 8/2018 | Ahn | H04W 72/042 |
| 2018/0262313 | A1* | 9/2018 | Nam | H04L 5/005 |
| 2018/0278314 | A1* | 9/2018 | Nam | H04B 7/0413 |
| 2018/0294848 | A1* | 10/2018 | Park | H04W 24/10 |
| 2018/0337757 | A1* | 11/2018 | Noh | H04L 5/0048 |
| 2018/0343653 | A1* | 11/2018 | Guo | H04L 5/0053 |
| 2018/0376351 | A1* | 12/2018 | Nagaraja | H04W 24/02 |
| 2019/0052334 | A1* | 2/2019 | Jeon | H04J 13/0062 |
| 2019/0097693 | A1* | 3/2019 | Park | H04L 5/0023 |
| 2019/0115955 | A1* | 4/2019 | John Wilson | H04L 5/0048 |
| 2019/0132031 | A1* | 5/2019 | Park | H04B 7/0469 |
| 2019/0141691 | A1* | 5/2019 | Kwon | H04W 72/12 |
| 2019/0222289 | A1* | 7/2019 | John Wilson | H04L 5/0073 |
| 2019/0230545 | A1* | 7/2019 | Liou | H04W 24/10 |
| 2019/0260425 | A1* | 8/2019 | Ji | H04L 5/0091 |
| 2019/0260445 | A1* | 8/2019 | John Wilson | H04B 7/0486 |
| 2019/0260532 | A1* | 8/2019 | Manolakos | H04L 5/0023 |
| 2019/0268053 | A1* | 8/2019 | John Wilson | H04B 7/0634 |
| 2019/0312708 | A1* | 10/2019 | Bai | H04W 72/0413 |
| 2019/0334603 | A1* | 10/2019 | Venugopal | H04B 17/309 |
| 2019/0342907 | A1* | 11/2019 | Huang | H04W 72/1289 |
| 2019/0349964 | A1* | 11/2019 | Liou | H04W 76/27 |
| 2020/0099432 | A1* | 3/2020 | Maattanen | H04L 5/00 |
| 2020/0107235 | A1* | 4/2020 | Peisa | H04W 74/0833 |
| 2020/0304186 | A1* | 9/2020 | Venugopal | H04B 7/0608 |
| 2020/0359459 | A1* | 11/2020 | Kakishima | H04W 76/27 |
| 2020/0367075 | A1* | 11/2020 | Nagaraja | H04W 24/02 |
| 2020/0395988 | A1* | 12/2020 | Lee | H04B 7/0626 |
| 2021/0044397 | A1* | 2/2021 | Khoshnevisan | H04W 72/048 |
| 2021/0045149 | A1* | 2/2021 | Davydov | H04L 5/0023 |
| 2021/0058826 | A1* | 2/2021 | Mao | H04W 28/0804 |
| 2021/0160905 | A1* | 5/2021 | Liou | H04L 5/0051 |

OTHER PUBLICATIONS

Partial International Search Report—PCT/US2020/023628—ISAEPO—dated May 20, 2020.

* cited by examiner

BEAM UPDATE TECHNIQUES IN WIRELESS COMMUNICATIONS

CROSS REFERENCE

The present application for patent claims the benefit of U.S. Provisional Patent Application No. 62/822,587 by VENUGOPAL et al., entitled "BEAM UPDATE TECHNIQUES IN WIRELESS COMMUNICATIONS," filed Mar. 22, 2019, assigned to the assignee hereof, and expressly incorporated by reference herein.

BACKGROUND

The following relates generally to wireless communications, and more specifically to beam update techniques in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some examples of a wireless communications system, a base station and UE may communicate via highly directional waves (e.g., beams). For example, a base station may transmit downlink transmissions via one or more downlink beams, and a UE may receive the one or more downlink transmissions via one or more receive beams. In some cases a UE may be configured with one or more transmission configuration indicator (TCI) state configurations. Different TCI states, distinguished by different values of the TCI, may correspond to quasi co-location (QCL) relationships with different reference signal transmissions. In some cases, a UE may measure a reference signal using receive beamforming parameters based on a TCI state indicated for the reference signal transmission from a base station. In some situations, one or more different beamforming parameters may be identified (e.g., due to performing a beam refinement procedure) that may provide enhanced performance relative to the beamforming parameters of the reference signal. Efficient techniques to provide an indication of such refined beamforming parameters may help enhance network performance and reliability.

SUMMARY

The described techniques relate to improved methods, systems, devices, and apparatuses that support beam update techniques in wireless communications. According to various aspects of the disclosure, a transmitting device (e.g., a base station or a user equipment (UE)) may indicate an update to a beam used for communications between the transmitting device and a receiving device (e.g., a UE or a base station). The receiving device may use the indicated update to modify one or more receive parameters (e.g., antenna weights, antenna gains, etc., at a receive antenna array) to enhance reception of a communication from the transmitting device.

In some cases, a first set of beamforming parameters for communications between the transmitting device and the receiving device may be determined based on a beam training procedure. The transmitting device, receiving device, or both, may perform a beam refinement procedure in which one or more beamforming parameters may be refined from the first set of beamforming parameters. For example, a base station may transmit a reference signal based on the first beamforming parameters, and may determine a second set of beamforming parameters that is to be used for a data transmission (e.g., based on a beam refinement procedure using one or more reference signals transmitted by a UE). In some cases, the base station may transmit an indication of a difference between the first set of beamforming parameters and the second set of beamforming parameters. The UE may use the indication of the difference to adjust one or more receive parameters for reception of the data transmission, and thereby enhance the likelihood of successfully receiving the data transmission. Additionally or alternatively, the UE may transmit a measurement report and an indication of the beamforming parameters used to measure a received beam associated with the measurement report.

A method of wireless communication at a transmitting device is described. The method may include transmitting a reference signal to a receiving device using a first set of beamforming parameters determined based on a beam training procedure between the transmitting device and the receiving device, determining, based on a beam refinement procedure at the transmitting device, a refined set of beamforming parameters for a data communication to the receiving device, and transmitting an indication of a difference between the first set of beamforming parameters and the refined set of beamforming parameters to the receiving device.

An apparatus for wireless communication at a transmitting device is described. The apparatus may include a processor, memory in electronic communication with the processor, and instructions stored in the memory. The instructions may be executable by the processor to cause the apparatus to transmit a reference signal to a receiving device using a first set of beamforming parameters determined based on a beam training procedure between the transmitting device and the receiving device, determine, based on a beam refinement procedure at the transmitting device, a refined set of beamforming parameters for a data communication to the receiving device, and transmit an indication of a difference between the first set of beamforming parameters and the refined set of beamforming parameters to the receiving device.

Another apparatus for wireless communication at a transmitting device is described. The apparatus may include means for transmitting a reference signal to a receiving device using a first set of beamforming parameters determined based on a beam training procedure between the transmitting device and the receiving device, determining, based on a beam refinement procedure at the transmitting device, a refined set of beamforming parameters for a data communication to the receiving device, and transmitting an indication of a difference between the first set of beamforming parameters and the refined set of beamforming parameters to the receiving device.

A non-transitory computer-readable medium storing code for wireless communication at a transmitting device is described. The code may include instructions executable by a processor to transmit a reference signal to a receiving device using a first set of beamforming parameters determined based on a beam training procedure between the transmitting device and the receiving device, determine, based on a beam refinement procedure at the transmitting device, a refined set of beamforming parameters for a data communication to the receiving device, and transmit an indication of a difference between the first set of beamforming parameters and the refined set of beamforming parameters to the receiving device.

Some examples of the method, apparatuses, and non-transitory computer-readable medium described herein may further include operations, features, means, or instructions for exchanging configuration information with the receiving device, the configuration information including one or more configured difference values, and where the indication of the difference provides an indication of the one or more configured difference values. In some examples of the method, apparatuses, and non-transitory computer-readable medium described herein, the configuration information may be exchanged via radio resource control signaling. In some examples of the method, apparatuses, and non-transitory computer-readable medium described herein, the transmitting the indication of the difference may include operations, features, means, or instructions for transmitting control information associated with the data communication that includes the indication of the difference between the first set of beamforming parameters and the refined set of beamforming parameters to the receiving device.

In some examples of the method, apparatuses, and non-transitory computer-readable medium described herein, the transmitting device may be a base station, and the control information includes downlink control information transmitted to a user equipment. In some examples of the method, apparatuses, and non-transitory computer-readable medium described herein, the transmitting device may be a user equipment, and the control information includes uplink control information transmitted to a base station. In some examples of the method, apparatuses, and non-transitory computer-readable medium described herein, the control information includes a medium access control (MAC) control element (CE) that indicates the difference between the first set of beamforming parameters and the refined set of beamforming parameters to the receiving device.

In some examples of the method, apparatuses, and non-transitory computer-readable medium described herein, the first set of beamforming parameters may be quasi-co-location parameters and where the difference between the first set of beamforming parameters and the refined set of beamforming parameters include a difference in one or more of the quasi-co-location parameters. In some examples of the method, apparatuses, and non-transitory computer-readable medium described herein, the quasi-co-location (QCL) parameters include one or more of QCL type A parameters, QCL type B parameters, QCL type C parameters, or QCL type D parameters. In some examples of the method, apparatuses, and non-transitory computer-readable medium described herein, the difference in one or more quasi-co-location parameters includes an explicit difference value or an implicit indication of a difference based on one or more preconfigured differences in the one or more quasi-co-location parameters.

Some examples of the method, apparatuses, and non-transitory computer-readable medium described herein may further include operations, features, means, or instructions for receiving, from the receiving device, a channel state information report and an indication of a quasi-co-location assumption used to determine one or more channel state information parameters of the channel state information report, and where the refined set of beamforming parameters is based on the channel state information report and the indication of the quasi-co-location assumption. Some examples of the method, apparatuses, and non-transitory computer-readable medium described herein may further include operations, features, means, or instructions for transmitting the data communication to the receiving device using the refined set of beamforming parameters.

A method of wireless communication at a receiving device is described. The method may include identifying a first set of beamforming parameters determined based on a beam training procedure between a transmitting device and the receiving device, receiving, from the transmitting device, an indication of a difference between the first set of beamforming parameters and a refined set of beamforming parameters that are used by the transmitting device for a data communication to the receiving device, and receiving the data communication from the transmitting device based on the indicated difference between the first set of beamforming parameters and the refined set of beamforming parameters.

An apparatus for wireless communication at a receiving device is described. The apparatus may include a processor, memory in electronic communication with the processor, and instructions stored in the memory. The instructions may be executable by the processor to cause the apparatus to identify a first set of beamforming parameters determined based on a beam training procedure between a transmitting device and the receiving device, receive, from the transmitting device, an indication of a difference between the first set of beamforming parameters and a refined set of beamforming parameters that are used by the transmitting device for a data communication to the receiving device, and receive the data communication from the transmitting device based on the indicated difference between the first set of beamforming parameters and the refined set of beamforming parameters.

Another apparatus for wireless communication at a receiving device is described. The apparatus may include means for identifying a first set of beamforming parameters determined based on a beam training procedure between a transmitting device and the receiving device, receiving, from the transmitting device, an indication of a difference between the first set of beamforming parameters and a refined set of beamforming parameters that are used by the transmitting device for a data communication to the receiving device, and receiving the data communication from the transmitting device based on the indicated difference between the first set of beamforming parameters and the refined set of beamforming parameters.

A non-transitory computer-readable medium storing code for wireless communication at a receiving device is described. The code may include instructions executable by a processor to identify a first set of beamforming parameters determined based on a beam training procedure between a transmitting device and the receiving device, receive, from the transmitting device, an indication of a difference between the first set of beamforming parameters and a refined set of beamforming parameters that are used by the transmitting device for a data communication to the receiving device, and receive the data communication from the transmitting device based on the indicated difference between the first set of beamforming parameters and the refined set of beamforming parameters.

Some examples of the method, apparatuses, and non-transitory computer-readable medium described herein may further include operations, features, means, or instructions for exchanging configuration information with the transmitting device, the configuration information including one or more configured difference values, and where the indicated difference between the first set of beamforming parameters and the refined set of beamforming parameters may be an indication of the one or more configured difference values. In some examples of the method, apparatuses, and non-transitory computer-readable medium described herein, the configuration information may be exchanged via radio resource control signaling. In some examples of the method, apparatuses, and non-transitory computer-readable medium described herein, the receiving the indication of the difference may include operations, features, means, or instructions for receiving control information associated with the data communication that includes the indication of the difference between the first set of beamforming parameters and the refined set of beamforming parameters to the receiving device.

In some examples of the method, apparatuses, and non-transitory computer-readable medium described herein, the receiving device may be a user equipment, and the control information includes downlink control information transmitted to the user equipment. In some examples of the method, apparatuses, and non-transitory computer-readable medium described herein, the receiving device may be a base station, and the control information includes uplink control information transmitted to from a user equipment. In some examples of the method, apparatuses, and non-transitory computer-readable medium described herein, the control information includes a MAC-CE that indicates the difference between the first set of beamforming parameters and the refined set of beamforming parameters to the receiving device.

In some examples of the method, apparatuses, and non-transitory computer-readable medium described herein, the first set of beamforming parameters may be quasi-co-location parameters and where the difference between the first set of beamforming parameters and the refined set of beamforming parameters include a difference in one or more of the quasi-co-location parameters. In some examples of the method, apparatuses, and non-transitory computer-readable medium described herein, the quasi-co-location (QCL) parameters include one or more of QCL type A parameters, QCL type B parameters, QCL type C parameters, or QCL type D parameters. In some examples of the method, apparatuses, and non-transitory computer-readable medium described herein, the difference in one or more quasi-co-location parameters includes an explicit difference value or an implicit indication of a difference based on one or more preconfigured differences in the one or more quasi-co-location parameters. Some examples of the method, apparatuses, and non-transitory computer-readable medium described herein may further include operations, features, means, or instructions for receiving the data communication from the transmitting device using the refined set of beamforming parameters.

A method of wireless communication at a UE is described. The method may include determining one or more channel state information parameters based on a reference signal received from a base station, where the reference signal corresponds to a first set of beamforming parameters and the one or more channel state information parameters are determined based on one or more of a second set of beamforming parameters or a third set of beamforming parameters that are different than the first set of beamforming parameters, formatting a channel state information report that includes the one or more channel state information parameters, and transmitting the channel state information report and an indication of one or more of the second set of beamforming parameters or third set of beamforming parameters to the base station.

An apparatus for wireless communication at a UE is described. The apparatus may include a processor, memory in electronic communication with the processor, and instructions stored in the memory. The instructions may be executable by the processor to cause the apparatus to determine one or more channel state information parameters based on a reference signal received from a base station, where the reference signal corresponds to a first set of beamforming parameters and the one or more channel state information parameters are determined based on one or more of a second set of beamforming parameters or a third set of beamforming parameters that are different than the first set of beamforming parameters, format a channel state information report that includes the one or more channel state information parameters, and transmit the channel state information report and an indication of one or more of the second set of beamforming parameters or third set of beamforming parameters to the base station.

Another apparatus for wireless communication at a UE is described. The apparatus may include means for determining one or more channel state information parameters based on a reference signal received from a base station, where the reference signal corresponds to a first set of beamforming parameters and the one or more channel state information parameters are determined based on one or more of a second set of beamforming parameters or a third set of beamforming parameters that are different than the first set of beamforming parameters, formatting a channel state information report that includes the one or more channel state information parameters, and transmitting the channel state information report and an indication of one or more of the second set of beamforming parameters or third set of beamforming parameters to the base station.

A non-transitory computer-readable medium storing code for wireless communication at a UE is described. The code may include instructions executable by a processor to determine one or more channel state information parameters based on a reference signal received from a base station, where the reference signal corresponds to a first set of beamforming parameters and the one or more channel state information parameters are determined based on one or more of a second set of beamforming parameters or a third set of beamforming parameters that are different than the first set of beamforming parameters, format a channel state information report that includes the one or more channel state information parameters, and transmit the channel state information report and an indication of one or more of the second set of beamforming parameters or third set of beamforming parameters to the base station.

In some examples of the method, apparatuses, and non-transitory computer-readable medium described herein, the second set of beamforming parameters correspond to a quasi-co-location (QCL) assumption associated with the reference signal, and the third set of beamforming parameters may be determined based on a receive beam refinement procedure at the UE. In some examples of the method, apparatuses, and non-transitory computer-readable medium described herein, the indication of one or more of the second set of beamforming parameters or third set of beamforming parameters indicates one or more of a receive beam used to receive the reference signal, a codebook assumption used to determine the one or more channel state information parameters, an indication of a difference between the second set of beamforming parameters and the third set of beamforming parameters, or any combinations thereof.

Some examples of the method, apparatuses, and non-transitory computer-readable medium described herein may further include operations, features, means, or instructions for receiving, from the base station, configuration information that configures the UE to transmit the indication of the second set of beamforming parameters or third set of beamforming parameters. In some examples of the method, apparatuses, and non-transitory computer-readable medium described herein, the indication of the second set of beamforming parameters provides quasi-co-location (QCL) parameters that include one or more of QCL type A parameters, QCL type B parameters, QCL type C parameters, or QCL type D parameters. In some examples of the method, apparatuses, and non-transitory computer-readable medium described herein, the indication of the third set of beamforming parameters indicates a difference in one or more of the quasi-co-location parameters relative to the second set of beamforming parameters.

A method of wireless communication at a base station is described. The method may include transmitting a reference signal to a UE using a first set of beamforming parameters, receiving, from the UE, a channel state information report and an indication of one or more of a second set of beamforming parameters or a third set of beamforming parameters used by the UE to determine one or more channel state information parameters that are included in the channel state information report, determining, based on the channel state information report and the indication, a refined first set of beamforming parameters for a data communication to the UE, and transmitting an indication of a difference between the first set of beamforming parameters and the refined first set of beamforming parameters to the UE.

An apparatus for wireless communication at a base station is described. The apparatus may include a processor, memory in electronic communication with the processor, and instructions stored in the memory. The instructions may be executable by the processor to cause the apparatus to transmit a reference signal to a UE using a first set of beamforming parameters, receive, from the UE, a channel state information report and an indication of one or more of a second set of beamforming parameters or a third set of beamforming parameters used by the UE to determine one or more channel state information parameters that are included in the channel state information report, determine, based on the channel state information report and the indication, a refined first set of beamforming parameters for a data communication to the UE, and transmit an indication of a difference between the first set of beamforming parameters and the refined first set of beamforming parameters to the UE.

Another apparatus for wireless communication at a base station is described. The apparatus may include means for transmitting a reference signal to a UE using a first set of beamforming parameters, receiving, from the UE, a channel state information report and an indication of one or more of a second set of beamforming parameters or a third set of beamforming parameters used by the UE to determine one or more channel state information parameters that are included in the channel state information report, determining, based on the channel state information report and the indication, a refined first set of beamforming parameters for a data communication to the UE, and transmitting an indication of a difference between the first set of beamforming parameters and the refined first set of beamforming parameters to the UE.

A non-transitory computer-readable medium storing code for wireless communication at a base station is described. The code may include instructions executable by a processor to transmit a reference signal to a UE using a first set of beamforming parameters, receive, from the UE, a channel state information report and an indication of one or more of a second set of beamforming parameters or a third set of beamforming parameters used by the UE to determine one or more channel state information parameters that are included in the channel state information report, determine, based on the channel state information report and the indication, a refined first set of beamforming parameters for a data communication to the UE, and transmit an indication of a difference between the first set of beamforming parameters and the refined first set of beamforming parameters to the UE.

In some examples of the method, apparatuses, and non-transitory computer-readable medium described herein, the second set of beamforming parameters correspond to a quasi-co-location (QCL) assumption of the UE that is associated with the reference signal, and the third set of beamforming parameters include one or more parameters determined based on a receive beam refinement procedure at the UE.

In some examples of the method, apparatuses, and non-transitory computer-readable medium described herein, the indication of one or more of the second set of beamforming parameters or the third set of beamforming parameters indicates one or more of a receive beam used at the UE to receive the reference signal, a codebook assumption used at the UE to determine the one or more channel state information parameters, an indication of a difference between the second set of beamforming parameters and the third set of beamforming parameters, or any combinations thereof. Some examples of the method, apparatuses, and non-transitory computer-readable medium described herein may further include operations, features, means, or instructions for configuring, via radio resource control signaling, the UE to transmit the indication of one or more of the second set of beamforming parameters or the third set of beamforming parameters.

In some examples of the method, apparatuses, and non-transitory computer-readable medium described herein, the indication of the second set of beamforming parameters provides quasi-co-location (QCL) parameters that include one or more of QCL type A parameters, QCL type B parameters, QCL type C parameters, or QCL type D parameters. In some examples of the method, apparatuses, and non-transitory computer-readable medium described herein, the indication of the refined first set of beamforming parameters further indicates a difference in one or more of the quasi-co-location parameters relative to the first set of beamforming parameters.

DETAILED DESCRIPTION

Figure 1:
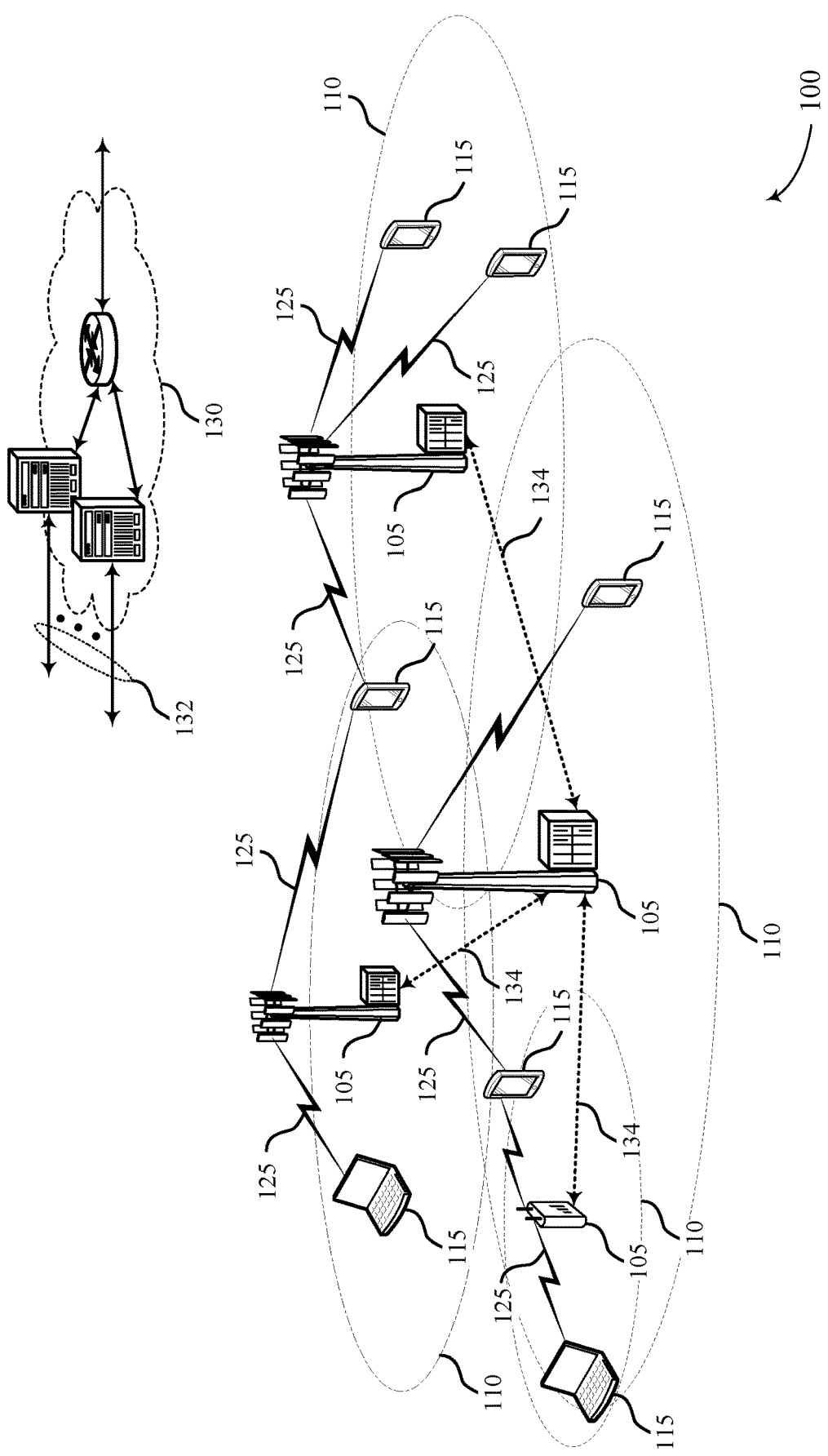
FIG. 1 illustrates an example of a system for wireless communications that supports beam update techniques in wireless communications in accordance with aspects of the present disclosure.

Various aspects of the present disclosure relate to methods, systems, devices, and apparatuses that support efficient beam update techniques in beamformed wireless communications between a transmitting device (e.g., a user equipment (UE) or a base station) and receiving device (e.g., a UE or a base station). In some cases, the transmitting device and the receiving device may establish a connection using one or more beamformed transmission beams. The devices may periodically perform beam refinement procedures or beam training procedures and may update the transmission beams used for communications based on such procedures. Signaling to indicate the updated transmission beams may be transmitted that indicates one or more of a difference or delta from a prior beamforming parameter, a beam that was used at the receiving device for one or more measurements of a reference signal from the transmitting device, or any combinations thereof.

For example, a UE may be configured with one or more transmission configuration indicator (TCI) state configurations. Different TCI states, distinguished by different values of the TCI, may correspond to quasi co-location (QCL) relationships with different reference signal transmissions (e.g. synchronization signal block (SSB) transmissions, channel state information reference signal (CSI-RS) transmissions, and the like). A particular TCI state may be identified based on an initial beam training procedure (e.g., a P1 beam training procedure in NR systems). One or more of the UE or base station may then perform a beam refinement procedure (e.g., a P2 or P3 beam refinement procedure in NR systems) and identify one or more refined parameters for communications. In accordance with techniques discussed herein, rather than provide an updated TCI state configuration (which consumes a relatively large amount of overhead and has signaling latency), a UE or base station may provide additional signaling in one or more transmissions (e.g., in a control signaling transmission) that indicates the updated parameter(s).

In some cases, a base station and a UE may establish a connection using a first set of beamforming parameters, which may be used to transmit a reference signal (e.g., a tracking reference signal (TRS), CSI-RS, a synchronization signal in a SSB, or any combinations thereof) from the base station to the UE. The base station may identify one or more updated parameters (e.g., based on a P2 beam refinement procedure), and may determine that a data transmission (e.g., a physical downlink shared channel (PDSCH) transmission) to the UE is to use the updated parameters (which may be referred to as a second set of beamforming parameters). The base station, according to some aspects of the present disclosure, may indicate a difference or delta between the reference signal, which may be QCL with a beam used for the date transmission, and the actual beam used for the data transmission.

In some cases, the difference or delta may be provided in terms of a larger or smaller parameter value indication (e.g., linked to QCL-A/B/C or in terms of peak gain), and may be conveyed in control information (e.g., downlink control information (DCI), or in a medium access control (MAC) control element (CE)). In some cases, one or more bits may be provided in a DCI transmitted from the base station that indicate or confirm to the UE if the same QCL assumption holds between the reference signal and the data transmission. In some cases, if the base station determines that a mismatch exists and the actual beam for the data transmission is a refined version of a QCL-assumed beam from the reference signal, a potential difference may be known for a post-beamforming signal to noise ratio (SNR), and indicated to the UE. In some cases, an indication of a difference in the QCL (e.g., one or more parameters of a QCL type AB/C) may be provided. In some cases, the base station and UE may exchange configuration information that maps one or more bits in a DCI to an amount of a difference in one or more QCL parameters (e.g., a difference in Doppler shift, Doppler spread, average delay, delay spread, or any combinations thereof). In some cases, if the beam used for the data transmission is a narrower beam, a new TCI state may need to be indicated, and the base station may trigger an update procedure to provide the new TCI state. It is noted that while this example discusses a base station that refines one or more parameters, a UE may, additionally or alternatively, use such techniques to indicate a difference in an uplink transmission (e.g., the UE may signal a difference between a sounding reference signal (SRS) beam and a subsequent physical uplink shared channel (PUSCH) transmission beam).

Additionally or alternatively, a UE may provide an indication of one or more beamforming parameters that were used for one or more reference signal measurements that are provided in a measurement report to a base station. In such cases, the UE may use a QCL assumption for reference signal measurements that may be different than the base station QCL assumptions (e.g., due to a refinement in a receive beam at the UE based on a P3 beam refinement procedure). The UE may transmit the measurement report (e.g., a CSI measurement report) and also indicate the assumption (e.g., an indication of a receive beam and a precoder selected from a linear combination codebook) that were used at the UE for computing one or more parameters included in the measurement report. In some cases, the base station may configure the UE via radio resource control (RRC) signaling (e.g., via RRC parameter csi-ReportConfig) to provide such an indication when transmitting a measurement report. In some cases, the UE may report QCL parameters (e.g., a QCL type D (spatial receive parameter) source), a precoding codebook assumption, or combinations thereof. Additionally, in some cases the UE may also indicate one or more other QCL parameters (e.g., QCL-type AB/C) that may be different than the assumed parameters for computing the measurement report.

Such techniques may allow for transmission beams to be updated relatively quickly when a transmission beam refinement is performed, and thus provide more efficient and reliable communications. Such techniques may be employed, in some examples, in system that uses beamforming and where a UE is moving between different beams or beam refinement procedures are performed. Accordingly, techniques such as discussed herein may enhance beamformed communications for such situations through faster and more efficient beam parameter updates that may avoid having to signal a new TCI state.

Aspects of the disclosure are initially described in the context of a wireless communications system. Aspects of the disclosure are further illustrated by and described with reference to apparatus diagrams, system diagrams, and flowcharts that relate to beam update techniques in wireless communications.

FIG. 1 illustrates an example of a wireless communications system 100 that supports beam update techniques in beamformed wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions (e.g., as part of a P1 beam training procedure), and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different beamforming parameters (e.g., receive beamforming weight sets applied to signals received at a plurality of antenna elements of an antenna array), or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

In some cases, when using beamformed communications, a transmitting device (e.g., a base station 105 or a UE 115) may indicate an update to a beam used for communications between the transmitting device and a receiving device (e.g., a UE or a base station). The receiving device may use the indicated update to modify one or more receive parameters (e.g., antenna weights, antenna gains, etc., at a receive antenna array) to enhance reception of a communication from the transmitting device.

Figure 2:
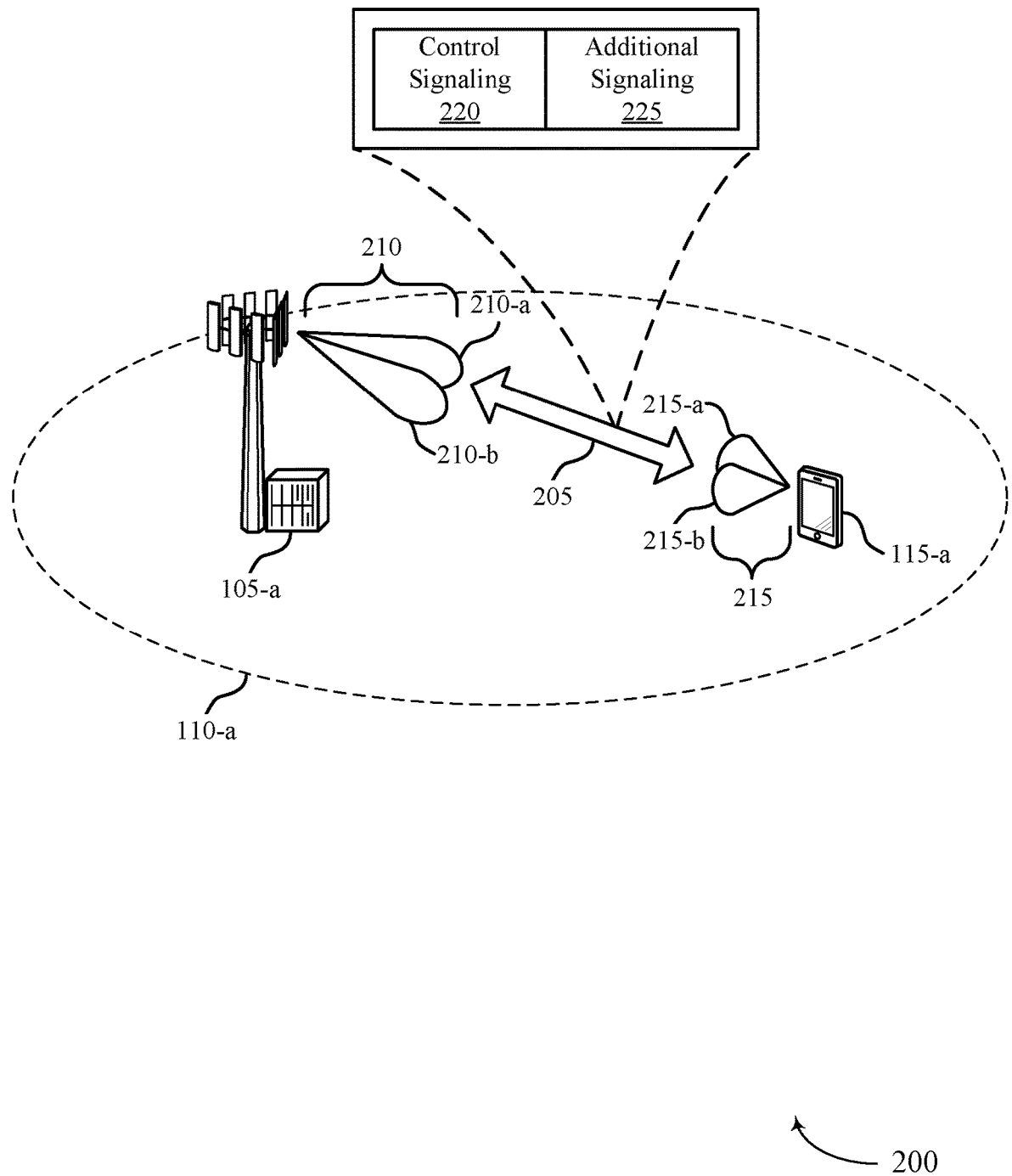
FIG. 2 illustrates an example of a wireless communications system that supports beam update techniques in wireless communications in accordance with aspects of the present disclosure.

FIG. 2 illustrates an example of a wireless communications system 200 that supports beam update techniques in wireless communications in accordance with aspects of the present disclosure. In some examples, wireless communications system 200 may implement aspects of wireless communications system 100. In the example of FIG. 2, wireless communications system 200 may include base station 105-a and UE 115-a, which may be examples of the corresponding devices described with respect to FIG. 1. Base station 105-a may provide network coverage for geographic coverage area 110-a. In this example, UE 115-a and base station 105-a may use beamformed communications to establish a connection 205 via one or more downlink beams 210 and one or more uplink beams 215.

In some cases, base station 105-a and UE 115-a may establish communication via connection 205 based on an initial beam training procedure (e.g., a P1 beam training procedure) in which QCL parameters for a first downlink beam 210-a and a first uplink beam 215-a are identified (e.g., according to a TCI indication of a number of available TCI states). Two antenna ports are said to be QCL if properties of the channel over which a symbol on one antenna port is conveyed can be inferred from the channel over which a symbol on the other antenna port is conveyed. In some cases, one or both of the UE 115-a or base station 105-a may perform a beam refinement procedure (e.g., a P2 beam refinement procedure for the base station 105-a, a P3 beam refinement procedure for the UE 115-a, or both) in which one or more reference signals may be measured to determine one or more refined beamforming parameters. For example, the base station 105-a may transmit a CSI-RS using a first set of beamforming parameters (e.g., according to a first TCI state) that may be measured at the UE 115-a to provide a CSI measurement report to the base station 105-a. Further, the UE 115-a may transmit one or more sounding reference signals (SRSs) using the first set of beamforming parameters that may be measured at the base station 105-a. In some cases, based on the reference signal measurements, updated beamforming parameters may be determined at one or both of the UE 115-a and the base station 105-a. In some cases, such beam refinements may be performed based at least in part on a transmitting device that transmits one or more reference signals (e.g., a channel state information (CSI) reference signal (CSI-RS) in a P2 (for downlink beams) and/or SRS in a P3 (for uplink beams) beam training procedure) to identify more focused beams for use in communications.

In accordance with techniques discussed herein, one or both of the UE 115-a or base station 105-a may transmit control signaling 220 (e.g., DCI, UCI, MAC-CE, or combinations thereof) and additional signaling 225 that may indicate an update to one or more beamforming parameters based on the beam refinement(s). In some cases, the additional signaling 225 may be transmitted as part of the control signaling 220 (e.g., in a defined field within DCI, UCI, or MAC-CE). In some cases, the base station 105-a may determine a second set of beamforming parameters for a second downlink beam 210-b based on the beam refinements (e.g., the P2 procedure), and the UE 115-a may determine a third set of beamforming parameters for a second uplink beam 215-b based on the beam refinements (e.g., the P3 procedure). The beam refinement procedures performed at each device may be transparent to the other device, and in traditional systems updated beamforming parameters determined by the refinement procedures would be communicated through a TCI update, which may result in latency due to having to trigger the update and may use a relatively large amount of overhead. By providing the additional signaling 225 with the control signaling 220 as discussed herein, such latency and overhead may be reduced, thereby enhancing efficiency and reliability of the wireless communications system 200.

In some cases, the base station 105-a may transmit the additional signaling 225 to indicate a difference or delta in terms of larger or smaller parameter value indication (e.g., linked to QCL-A/B/C or in terms of peak gain), that may be conveyed with the control signaling 220 (e.g., in DCI or a MAC-CE transmitted to the UE 115-a). In some cases, one or more bits may be provided in a DCI transmitted from the base station 105-a that indicate or confirm to the UE 115-a if the same QCL assumption holds between a prior transmitted reference signal and a data transmission. In some cases, if the base station 105-a determines that a mismatch exists and the actual beam for the data transmission is a refined version of QCL-assumed beam from the reference signal, a potential difference may be known for a post-beamforming SNR that is indicated to the UE 115-a. The UE 115-a may receive the indication of the difference or delta, and modify one or more receive beamforming parameters (e.g., according to one or more predetermined adjustments) to receive and decode the data transmission. In some cases, an indication of a difference in the QCL (e.g., one or more parameters of a QCL type A/B/C) may be provided. In some cases, the base station 105-a and UE 115-a may exchange configuration information that maps one or more bits in DCI or a MAC-CE to an amount of a difference in one or more QCL parameters (e.g., a difference in Doppler shift, Doppler spread, average delay, delay spread, or any combinations thereof). In some cases, if the beam used for the data transmission is a narrower beam, a new TCI state may need to be indicated, and the base station 105-a may trigger an update procedure to provide the new TCI state. Similar techniques may be used when the UE 115-a is the transmitting device (e.g., the UE 115-a may signal a difference in additional signaling 225 between a SRS beam and a subsequent PUSCH beam).

Additionally or alternatively, the UE 115-a may provide an indication of one or more beamforming parameters (i.e., a QCL assumption) that were used for one or more reference signal measurements that are provided in a measurement report (e.g., a CSI measurement report) to the base station 105-a. In such cases, the UE 115-a may use a QCL assumption for reference signal measurements that may be different than the base station 105-a QCL assumptions (e.g., due to a refinement in a receive beam at the UE 115-a based on a P3 beam refinement procedure). The UE 115-a may transmit the measurement report (e.g., a CSI measurement report in control signaling 220) and also indicate the assumption (e.g., an indication of a receive beam and a precoder selected from a linear combination codebook in additional signaling 225) that were used at the UE 115-a for computing one or more parameters included in the measurement report. In some cases, the base station 105-a may configure the UE 115-a via RRC signaling (e.g., via RRC parameter csi-ReportConfig) to provide such an indication when transmitting a measurement report. In some cases, the UE 115-a may report QCL parameters (e.g., a QCL type D (spatial receive parameter) source), a precoding codebook assumption, or combinations thereof. Additionally, in some cases the UE 115-a may also indicate one or more other QCL parameters (e.g., QCL-type AB/C) that may be different than the assumed parameters for computing the measurement report.

It is noted that the operations described herein performed by a UE 115 and base station 105 may be respectively performed by a UE 115, a base station 105, or another wireless device, and the examples shown should not be construed as limiting. For instance, the operations shown as performed by base station 105-a may be performed by a UE 115-a, a TRP, or another wireless device.

Figure 3:
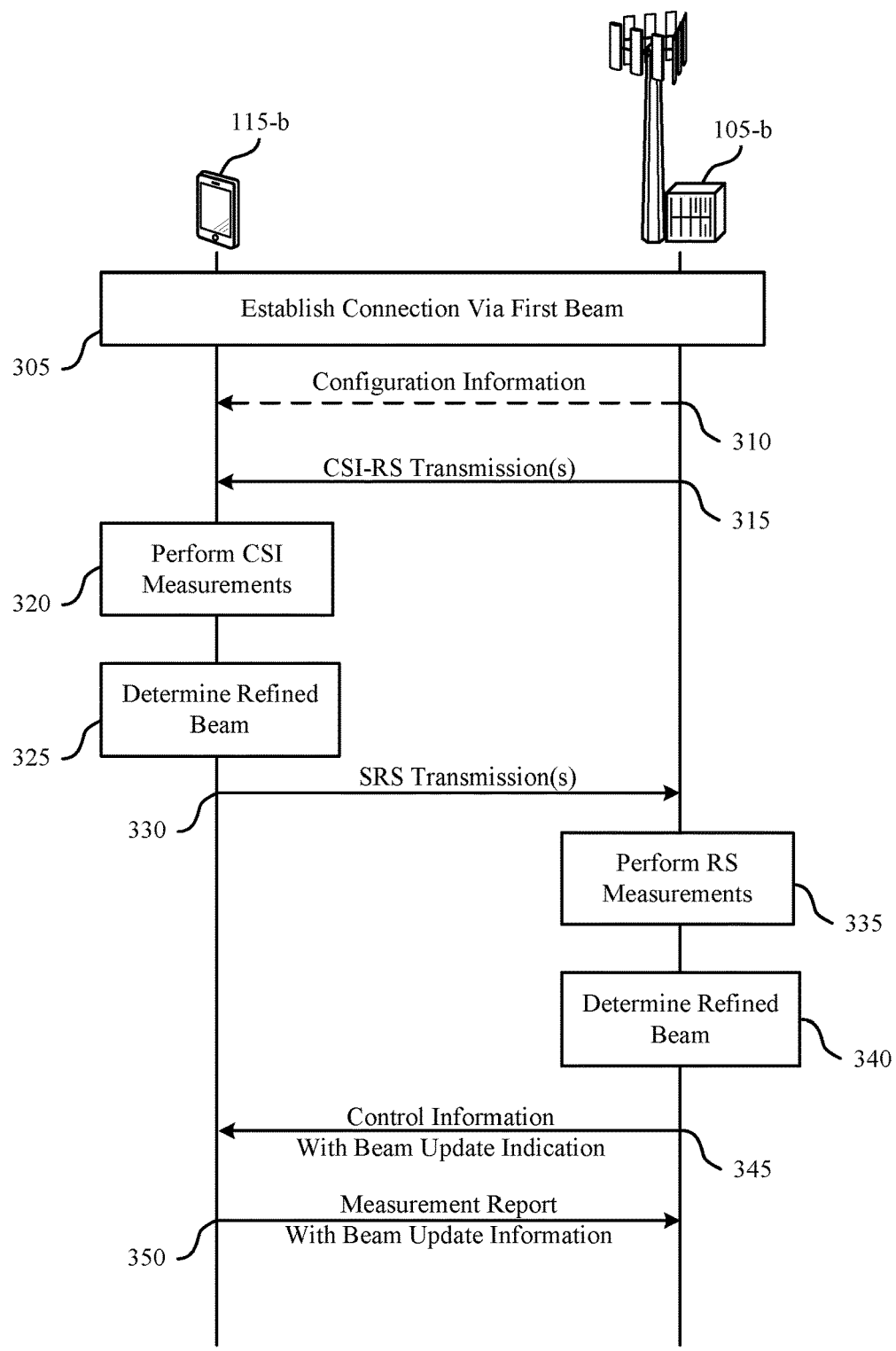
FIG. 3 illustrates an example of a process flow that supports beam update techniques in wireless communications in accordance with aspects of the present disclosure.

FIG. 3 illustrates an example of a process flow 300 that supports beam update techniques in wireless communications in accordance with aspects of the present disclosure. In some examples, process flow 300 may implement aspects of wireless communications system 100 or 200. For instance, process flow 300 includes a UE 115-b and a base station 105-b, which may be examples of a base station 105 or a UE 115, as described with reference to FIGS. 1 and 2. UE 115-b and base station 105-b may transmit indications of updated beamforming parameters based on one or more beam refinement procedures as discussed herein. Alternative examples of the following may be implemented, where some steps are performed in a different order than described or are not performed at all. In some cases, steps may include additional features not mentioned below, or further steps may be added.

At 305, UE 115-b and base station 105-b may establish a connection via a first beam. The connection may be established according to RRC connection establishment techniques, and/or the connection may be configured for a first set of beamforming parameters that are determined based on a beam training procedure. The first beam may have a first set of QCL parameters based on a first TCI state, for example.

The base station 105-b, at 310, optionally may transmit configuration information to the UE 115-b. In some cases, the configuration information may include information related to one or more fields that may be provided in control signaling (e.g., DCI, UCI, a MAC-CE, or any combinations thereof) that may indicate updated beam parameters of a transmitting device. For example, the base station 105-b may configure a single bit that may indicate updated beamforming parameters, and that the UE 115-b is to change one or more beamforming parameters for a subsequent data transmission. In some cases, the configuration information may provide a mapping between two or more bits of an updated beam indication and different adjustments to one or more beamforming parameters (e.g., a '00' may indicate no adjustment, '01' may indicate a first QCL adjustment, '10' may indicate a second QCL adjustment, etc.). In some cases, the configuration information may be provided as part of a connection establishment procedure.

At 315, the base station 105-b may transmit one or more CSI reference signals for measurement at the UE 115-b. The CSI reference signals may be transmitted using one or multiple beams, and, at 320, may be measured (e.g., at multiple antenna ports) at the UE 115-b.

At 325, the UE 115-b may determine a refined set of beamforming parameters based on the CSI measurements. For example, the UE 115-b may determine parameters for weighting and gain of antennas at one or more antenna panels of the UE 115-b that provide enhanced beam reception. In some cases, the UE 115-b may determine updated beamforming parameters for an uplink transmission beam (e.g., based on beam reciprocity).

At 330, the UE 115-b may transmit one or more SRS transmissions to the base station 105-b. The base station, at 335, may perform one or more measurements of the SRS.

At 340, the base station 105-b may determine a refined set of beamforming parameters based on the SRS measurements. For example, the base station 105-b may determine parameters for weighting and gain of antennas at one or more antenna panels of the base station 105-b that provide enhanced beam reception. In some cases, the base station 105-b may determine updated beamforming parameters for a downlink transmission beam (e.g., based on beam reciprocity).

At 345, the base station 105-b may transmit control information with a beam update indication to the UE 115-b. In some cases, the control information may be DCI transmitted to the UE 115-b that allocates downlink or uplink resources for a subsequent data transmission. In some cases, the control information may be a MAC-CE transmitted to the UE 115-b that includes an indication of the beam update.

At 350, the UE 115-b may transmit a measurement report with a beam update indication to the base station 105-b. In some cases, the measurement report may be transmitted in UCI from the UE 115-b to the base station 105-b, and the UCI may include one or more bits that indicate the beam update at the UE 115-b. In some cases, the UE 115-b may transmit a MAC-CE that indicated the beam update. The UE 115-b and base station 105-b may transmit one or more data transmissions according to the beam update information.

Figure 4:
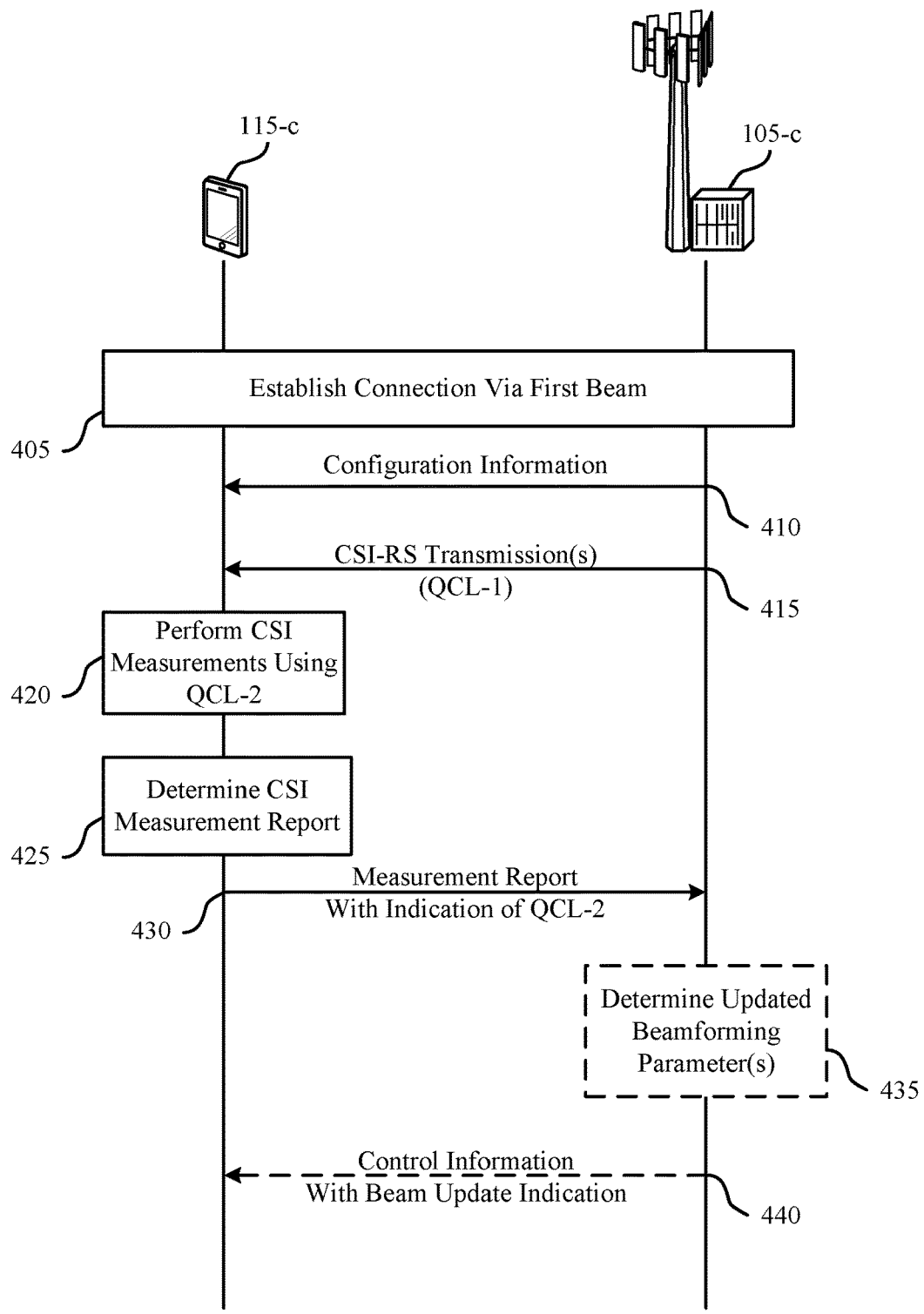
FIG. 4 illustrates an example of a process flow that supports beam update techniques in wireless communications in accordance with aspects of the present disclosure.

FIG. 4 illustrates an example of a process flow 400 that supports beam update techniques in wireless communications in accordance with aspects of the present disclosure. In some examples, process flow 400 may implement aspects of wireless communications system 100 or 200. For instance, process flow 400 includes a UE 115-c and a base station 105-c, which may be examples of a base station 105 or a UE 115, as described with reference to FIGS. 1 and 2. In this example, UE 115-c may use a particular set of beamforming parameters for one or more reference signal measurements, and may provide an indication of the beamforming parameters to base station 105-c, as discussed herein. Alternative examples of the following may be implemented, where some steps are performed in a different order than described or are not performed at all. In some cases, steps may include additional features not mentioned below, or further steps may be added.

At 405, UE 115-c and base station 105-c may establish a connection via a first beam. The connection may be established according to RRC connection establishment techniques, and/or the connection may be configured for a first set of beamforming parameters that are determined based on a beam training procedure. The first beam may have a first set of QCL parameters based on a first TCI state, for example.

The base station 105-c, at 410, may transmit configuration information to the UE 115-c. In some cases, the configuration information may include a configuration that the UE 115-c is to report an indication of receive beamforming parameters, codebook, and/or QCL assumptions used for one or more measurements. For example, the base station 105-c may configure this via RRC parameter csi-Report-Config. In some cases, the configuration information may be provided as part of a connection establishment procedure.

At 415, the base station 105-c may transmit one or more CSI reference signals for measurement at the UE 115-c. The CSI reference signals may be transmitted according to first QCL parameters, that are associated with a TCI state established between the UE 115-c and base station 105-c, in some examples.

At 420, the UE 115-c may perform CSI measurements according to at least a second QCL assumption. In some cases, the UE 115-c may perform CSI measurements according to multiple different QCL assumptions and may identify a most favorable or otherwise acceptable QCL assumption that provides enhanced reception at the UE 115-c.

At 425, the UE 115-c may determine a CSI measurement report. In some cases, the CSI measurement report may include one or more parameters based on the CSI measurements (e.g., a channel quality indicator (CQI), a precoding matrix indicator (PMI), a rank indicator (RI), or combinations thereof).

At 430, the UE 115-c may transmit a measurement report with an indication of the QCL assumption which is used for computing one or more parameters of the measurement report. In some cases, the measurement report may be transmitted in UCI from the UE 115-c to the base station 105-c, and the UCI may include one or more bits that indicate the TCI used at the UE 115-c.

Optionally at 435, the base station 105-c may determine an updated set of beamforming parameters based on the measurement report and indication of the UE 115-c QCL assumptions. For example, the base station 105-c may determine parameters for weighting and gain of antennas at one or more antenna panels of the base station 105-c that provide enhanced beam reception. At 445, the base station 105-c may optionally transmit control information with a beam update indication to the UE 115-c. In some cases, the control information may be DCI transmitted to the UE 115-c that allocates downlink or uplink resources for a subsequent data transmission. In some cases, the control information may be a MAC-CE transmitted to the UE 115-c that includes an indication of the beam update.

Figure 5:
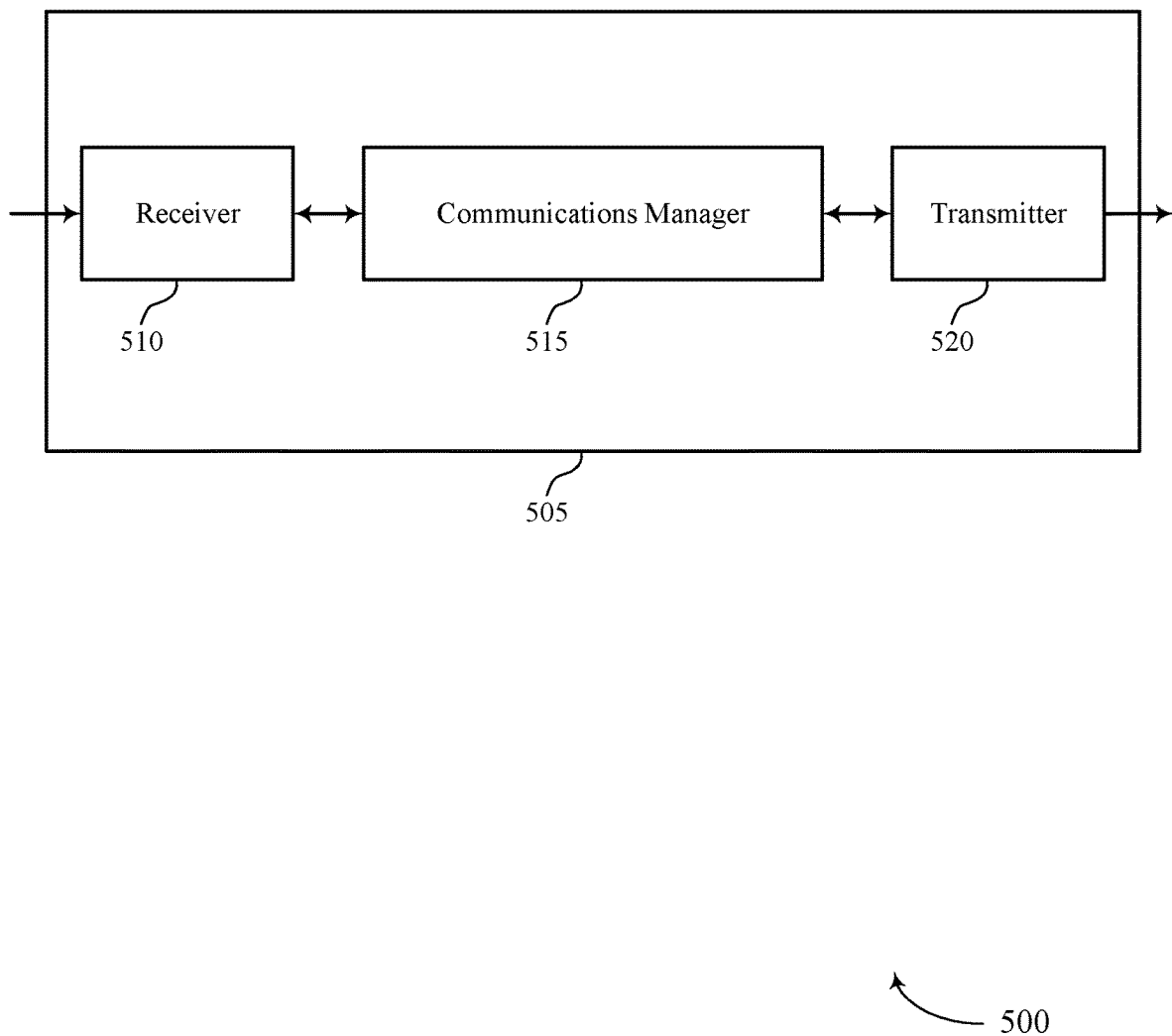
FIGS. 5 and 6 show block diagrams of devices that support beam update techniques in wireless communications in accordance with aspects of the present disclosure.

FIG. 5 shows a block diagram 500 of a device 505 that supports beam update techniques in wireless communications in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to beam update techniques in wireless communications, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may determine one or more channel state information parameters based on a reference signal received from a base station, where the reference signal corresponds to a first set of beamforming parameters and the one or more channel state information parameters are determined based on one or more of a second set of beamforming parameters or a third set of beamforming parameters that are different than the first set of beamforming parameters, format a channel state information report that includes the one or more channel state information parameters, and transmit the channel state information report and an indication of one or more of the second set of beamforming parameters or third set of beamforming parameters to the base station. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The action performed by communications manager 515 615 as described herein may be implemented to realize one or more potential advantages. One implementation may allow a UE 115 to save power and increase battery life by avoiding having to perform less efficient signaling procedures. Another implementation may provide improved quality and reliability of service at the UE 115, as latency at the UE 115 may be reduced.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

Figure 6:
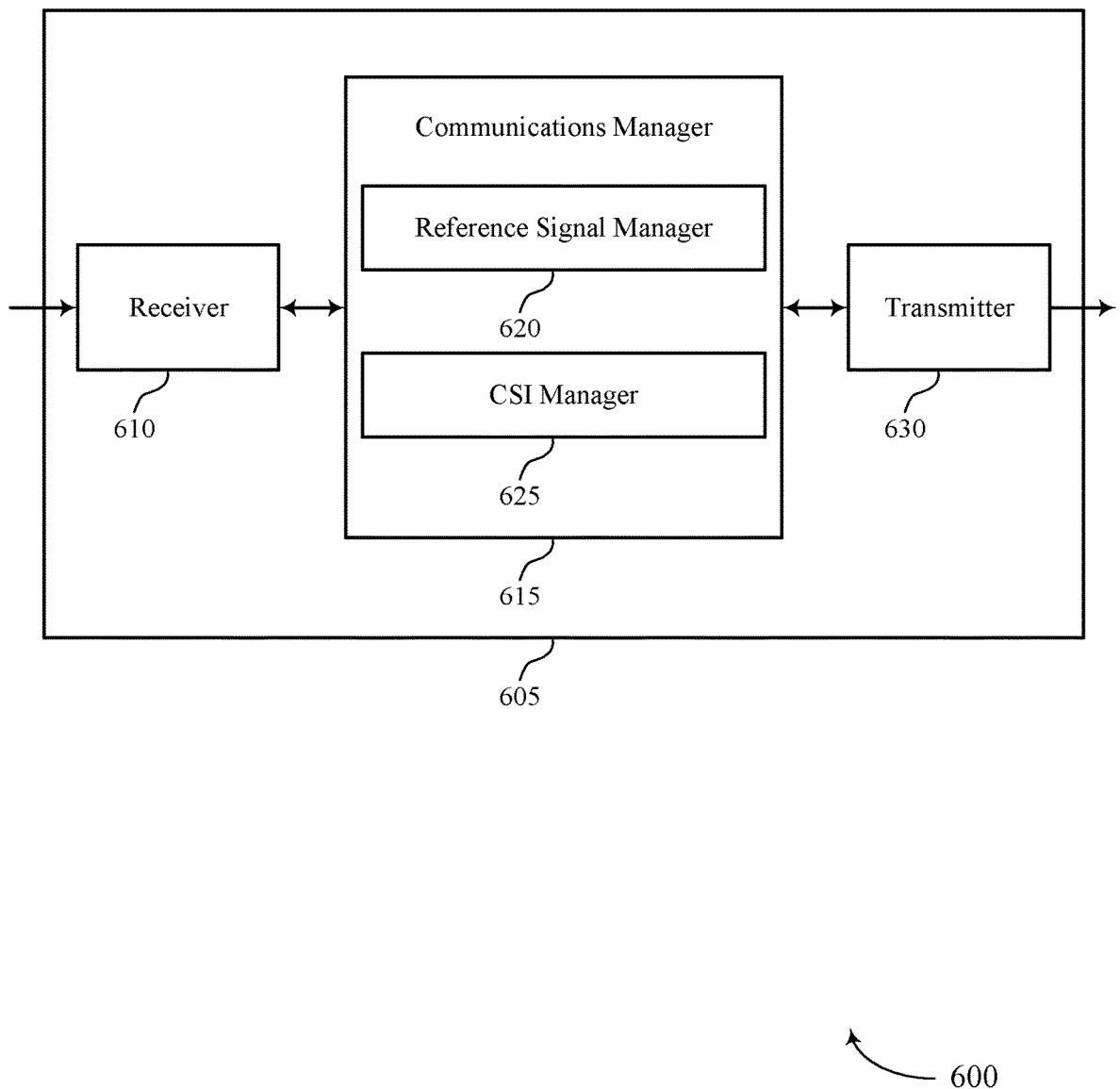

FIG. 6 shows a block diagram 600 of a device 605 that supports beam update techniques in wireless communications in accordance with aspects of the present disclosure. The device 605 may be an example of aspects of a device 505, or a UE 115 as described herein. The device 605 may include a receiver 610, a communications manager 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to beam update techniques in wireless communications, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a reference signal manager 620 and a CSI manager 625. The communications manager 615 may be an example of aspects of the communications manager 810 described herein.

The reference signal manager 620 may determine one or more channel state information parameters based on a reference signal received from a base station, where the reference signal corresponds to a first set of beamforming parameters and the one or more channel state information parameters are determined based on one or more of a second set of beamforming parameters or a third set of beamforming parameters that are different than the first set of beamforming parameters.

The CSI manager 625 may format a channel state information report that includes the one or more channel state information parameters and transmit the channel state information report and an indication of one or more of the second set of beamforming parameters or third set of beamforming parameters to the base station.

The transmitter 630 may transmit signals generated by other components of the device 605. In some examples, the transmitter 630 may be collocated with a receiver 610 in a transceiver component. For example, the transmitter 630 may be an example of aspects of the transceiver 820 described with reference to FIG. 8. The transmitter 630 may utilize a single antenna or a set of antennas.

Figure 7:
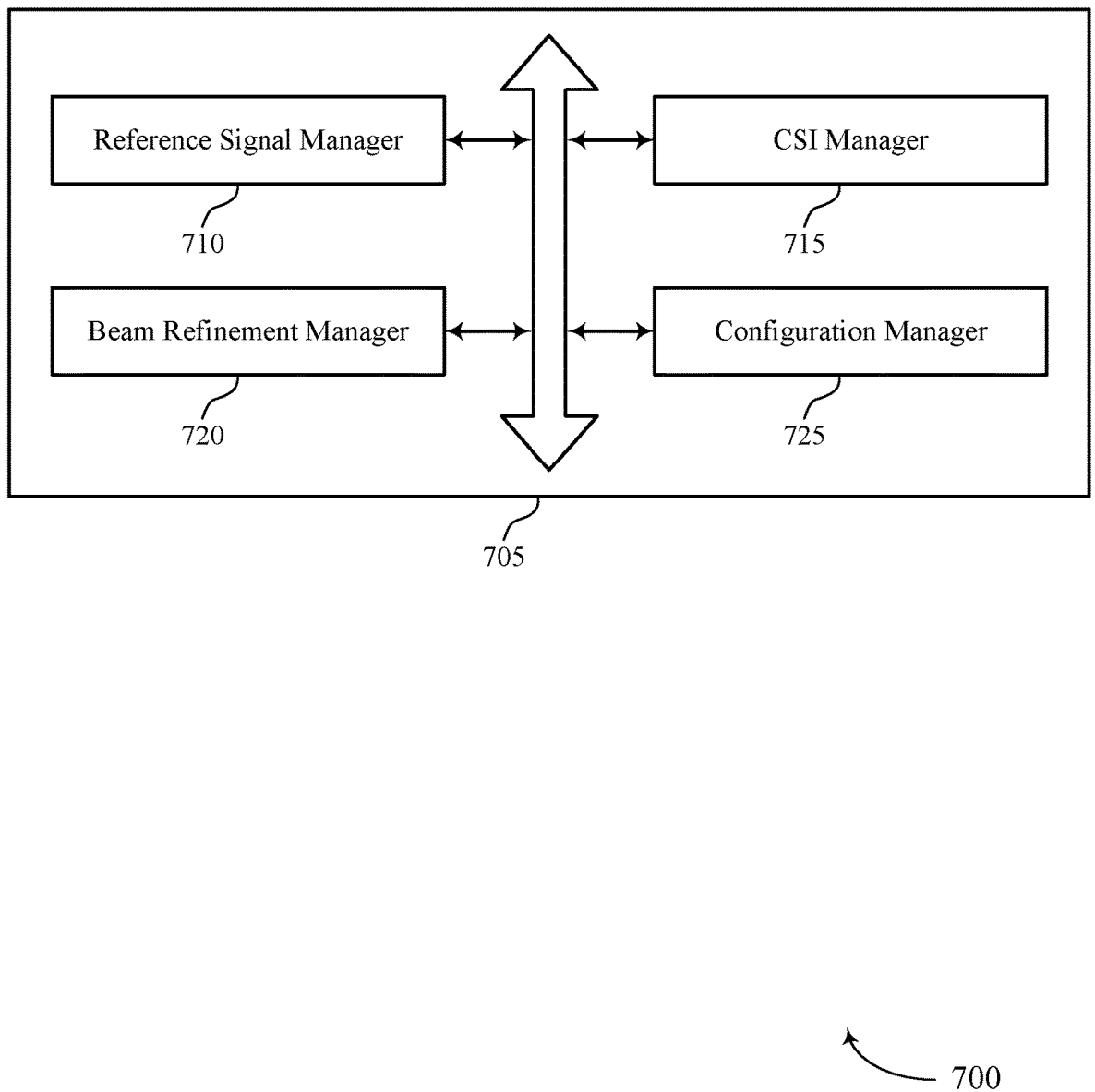
FIG. 7 shows a block diagram of a communications manager that supports beam update techniques in wireless communications in accordance with aspects of the present disclosure.

FIG. 7 shows a block diagram 700 of a communications manager 705 that supports beam update techniques in wireless communications in accordance with aspects of the present disclosure. The communications manager 705 may be an example of aspects of a communications manager 515, a communications manager 615, or a communications manager 810 described herein. The communications manager 705 may include a reference signal manager 710, a CSI manager 715, a beam refinement manager 720, and a configuration manager 725. Each of these components may communicate, directly or indirectly, with one another (e.g., via one or more buses).

The reference signal manager 710 may determine one or more channel state information parameters based on a reference signal received from a base station, where the reference signal corresponds to a first set of beamforming parameters and the one or more channel state information parameters are determined based on one or more of a second set of beamforming parameters or a third set of beamforming parameters that are different than the first set of beamforming parameters.

The CSI manager 715 may format a channel state information report that includes the one or more channel state information parameters. In some examples, the CSI manager 715 may transmit the channel state information report and an indication of one or more of the second set of beamforming parameters or third set of beamforming parameters to the base station.

The beam refinement manager 720 may determine one or more beam updates and associated set(s) of beamforming parameters. In some cases, the second set of beamforming parameters correspond to a quasi-co-location (QCL) assumption associated with the reference signal, and the third set of beamforming parameters are determined based on a receive beam refinement procedure at the UE. In some cases, the indication of one or more of the second set of beamforming parameters or third set of beamforming parameters indicates one or more of a receive beam used to receive the reference signal, a codebook assumption used to determine the one or more channel state information parameters, an indication of a difference between the second set of beamforming parameters and the third set of beamforming parameters, or any combinations thereof.

In some cases, the indication of the second set of beamforming parameters provides QCL parameters that include one or more of QCL type A parameters, QCL type B parameters, QCL type C parameters, or QCL type D parameters. In some cases, the indication of the third set of beamforming parameters indicates a difference in one or more of the QCL parameters relative to the second set of beamforming parameters.

The configuration manager 725 may receive, from the base station, configuration information that configures the UE to transmit the indication of the second set of beamforming parameters or third set of beamforming parameters.

Figure 8:
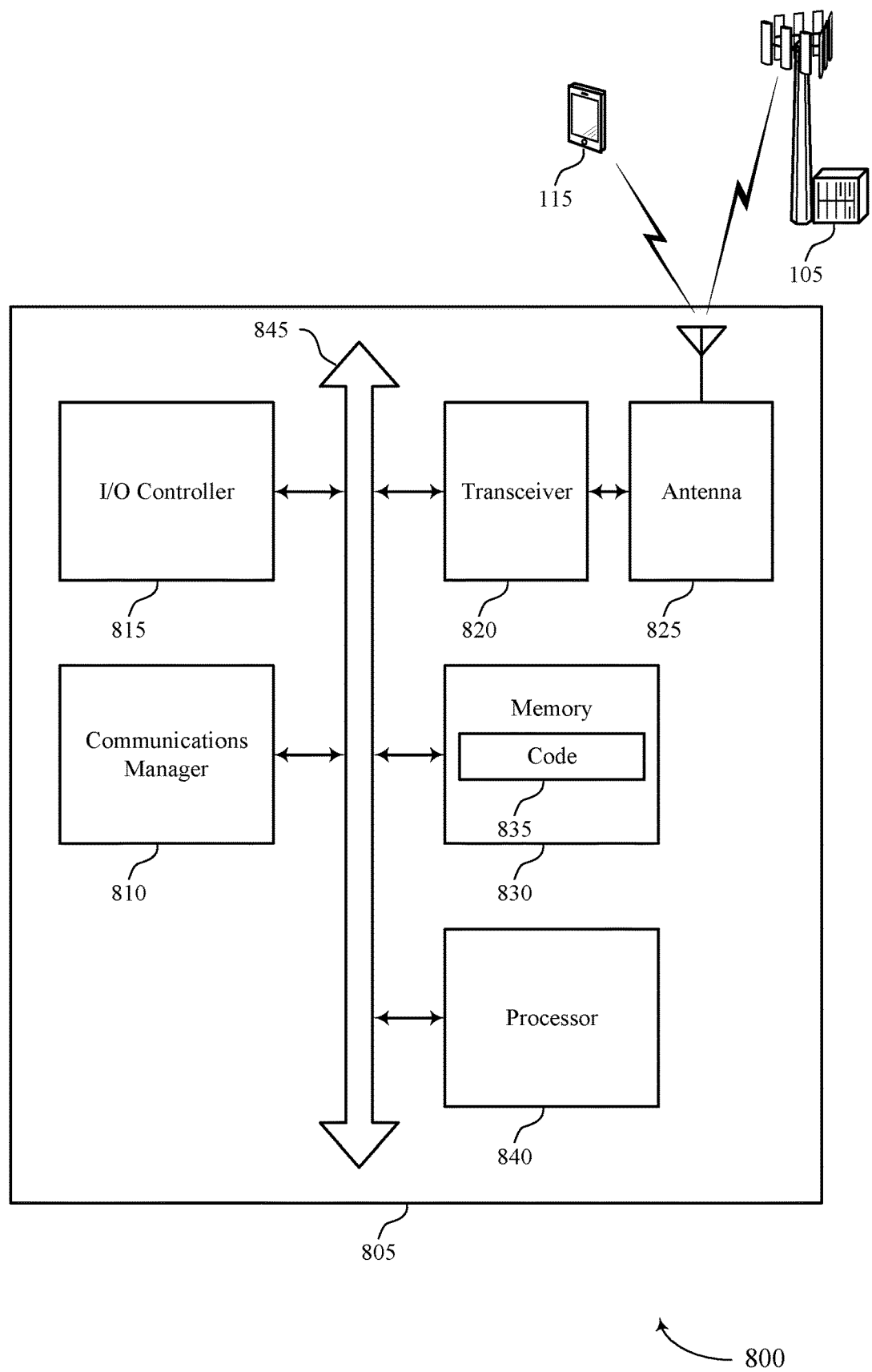
FIG. 8 shows a diagram of a system including a device that supports beam update techniques in wireless communications in accordance with aspects of the present disclosure.

FIG. 8 shows a diagram of a system 800 including a device 805 that supports beam update techniques in wireless communications in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may determine one or more channel state information parameters based on a reference signal received from a base station, where the reference signal corresponds to a first set of beamforming parameters and the one or more channel state information parameters are determined based on one or more of a second set of beamforming parameters or a third set of beamforming parameters that are different than the first set of beamforming parameters, format a channel state information report that includes the one or more channel state information parameters, and transmit the channel state information report and an indication of one or more of the second set of beamforming parameters or third set of beamforming parameters to the base station.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting beam update techniques in wireless communications).

Based on providing additional signaling that indicates an update to one or more beamforming parameters, a processor 840 of a UE 115 may efficiently perform beam refinement procedures. As such, when the beamforming parameters are transparent to a corresponding device as opposed through a TCI update, the processor may be ready to respond more efficiently through the reduction of a ramp up in processing power.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
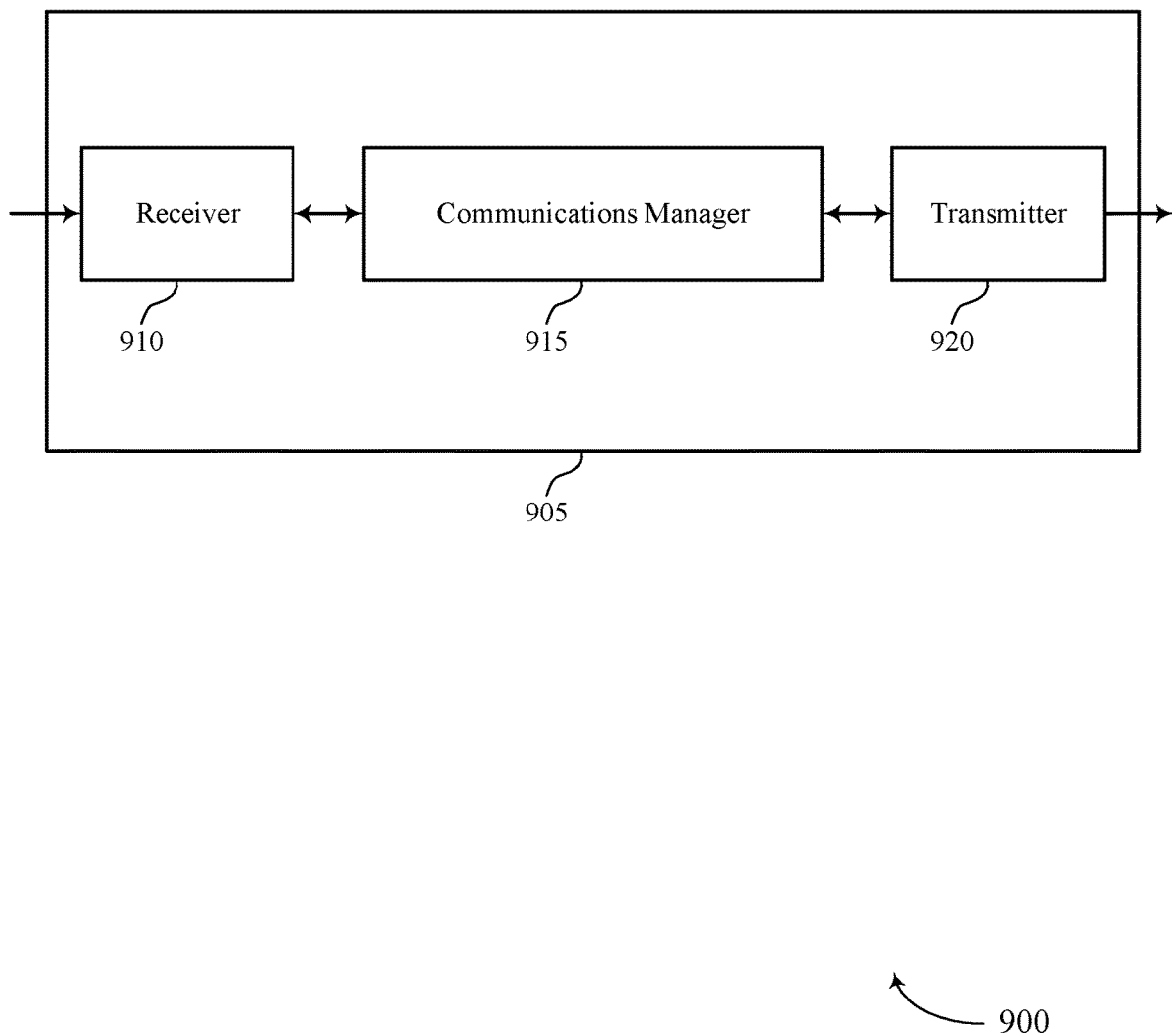
FIGS. 9 and 10 show block diagrams of devices that support beam update techniques in wireless communications in accordance with aspects of the present disclosure.

FIG. 9 shows a block diagram 900 of a device 905 that supports beam update techniques in wireless communications in accordance with aspects of the present disclosure. The device 905 may be an example of aspects of a UE 115 or base station 105 as described herein. The device 905 may include a receiver 910, a communications manager 915, and a transmitter 920. The device 905 may also include a processor. Each of these components may be in communication with one another (e.g., via one or more buses).

Receiver 910 may receive information such as packets, user data, or control information associated with various information channels (e.g., control channels, data channels, and information related to beam update techniques in wireless communications, etc.). Information may be passed on to other components of the device 905. The receiver 910 may be an example of aspects of the transceiver 1220 or 1320 as described with reference to FIGS. 12 and 13. The receiver 910 may utilize a single antenna or a set of antennas.

The communications manager 915 may transmit a reference signal to a receiving device using a first set of beamforming parameters determined based on a beam training procedure between the transmitting device and the receiving device, determine, based on a beam refinement procedure at the transmitting device, a refined set of beamforming parameters for a data communication to the receiving device, and transmit an indication of a difference between the first set of beamforming parameters and the refined set of beamforming parameters to the receiving device.

The communications manager 915 may also identify a first set of beamforming parameters determined based on a beam training procedure between a transmitting device and the receiving device, receive, from the transmitting device, an indication of a difference between the first set of beamforming parameters and a refined set of beamforming parameters that are used by the transmitting device for a data communication to the receiving device, and receive the data communication from the transmitting device based on the indicated difference between the first set of beamforming parameters and the refined set of beamforming parameters. The communications manager 915 may be an example of aspects of the communications manager 1210 or 1310 as described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 915 as described herein may be implemented to realize one or more potential advantages. One implementation may allow a base station 105 to provide improved quality and reliability of service at the base station 105, as latency may be reduced. Another implementation may provide reduced signaling as resource overhead may be reduced.

Transmitter 920 may transmit signals generated by other components of the device 905. In some examples, the transmitter 920 may be collocated with a receiver 910 in a transceiver component. For example, the transmitter 920 may be an example of aspects of the transceiver 1220 or 1320 as described with reference to FIGS. 12 and 13. The transmitter 920 may utilize a single antenna or a set of antennas.

Figure 10:
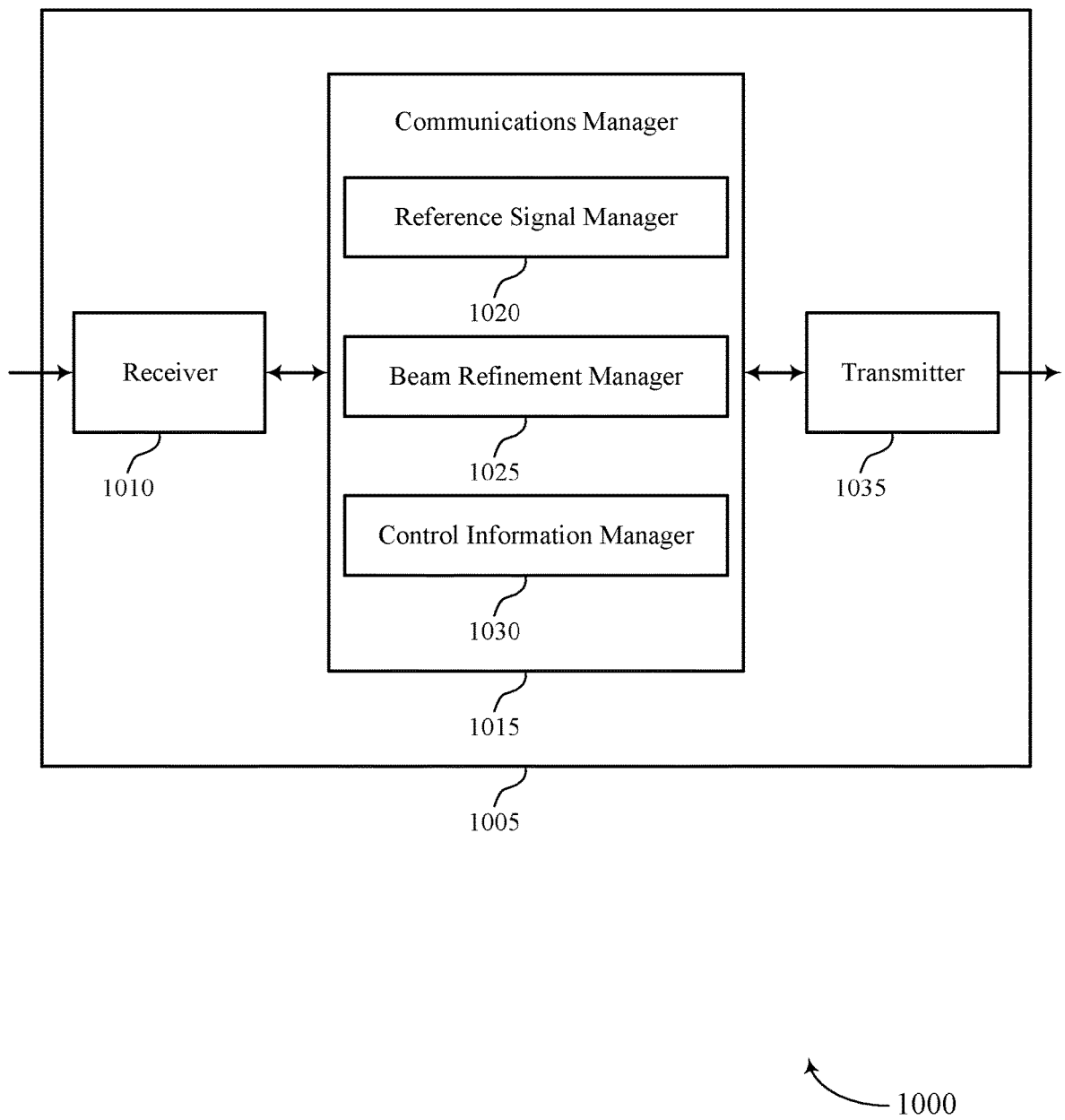

FIG. 10 shows a block diagram 1000 of a device 1005 that supports beam update techniques in wireless communications in accordance with aspects of the present disclosure. The device 1005 may be an example of aspects of a device 905, a UE 115, or a base station 105 as described herein. The device 1005 may include a receiver 1010, a communications manager 1015, and a transmitter 1035. The device 1005 may also include a processor. Each of these components may be in communication with one another (e.g., via one or more buses).

Receiver 1010 may receive information such as packets, user data, or control information associated with various information channels (e.g., control channels, data channels, and information related to beam update techniques in wireless communications, etc.). Information may be passed on to other components of the device 1005. The receiver 1010 may be an example of aspects of the transceiver 1220 or 1320 as described with reference to FIGS. 12 and 13. The receiver 1010 may utilize a single antenna or a set of antennas.

The communications manager 1015 may be an example of aspects of the communications manager 915 as described herein. The communications manager 1015 may include a reference signal manager 1020, a beam refinement manager 1025, and a control information manager 1030. The communications manager 1015 may be an example of aspects of the communications manager 1210 or 1310 as described herein.

The reference signal manager 1020 may transmit a reference signal to a receiving device using a first set of beamforming parameters determined based on a beam training procedure between the transmitting device and the receiving device. In some cases, the reference signal manager 1020 may identify a first set of beamforming parameters determined based on a beam training procedure between a transmitting device and the receiving device.

The beam refinement manager 1025 may determine, based on a beam refinement procedure at the transmitting device, a refined set of beamforming parameters for a data communication to the receiving device. In some cases, the beam refinement manager 1025 may receive, from the transmitting device, an indication of a difference between the first set of beamforming parameters and a refined set of beamforming parameters that are used by the transmitting device for a data communication to the receiving device and receive the data communication from the transmitting device based on the indicated difference between the first set of beamforming parameters and the refined set of beamforming parameters.

The control information manager 1030 may transmit an indication of a difference between the first set of beamforming parameters and the refined set of beamforming parameters to the receiving device.

Transmitter 1035 may transmit signals generated by other components of the device 1005. In some examples, the transmitter 1035 may be collocated with a receiver 1010 in a transceiver component. For example, the transmitter 1035 may be an example of aspects of the transceiver 1220 or 1320 as described with reference to FIGS. 12 and 13. The transmitter 1035 may utilize a single antenna or a set of antennas.

Figure 11:
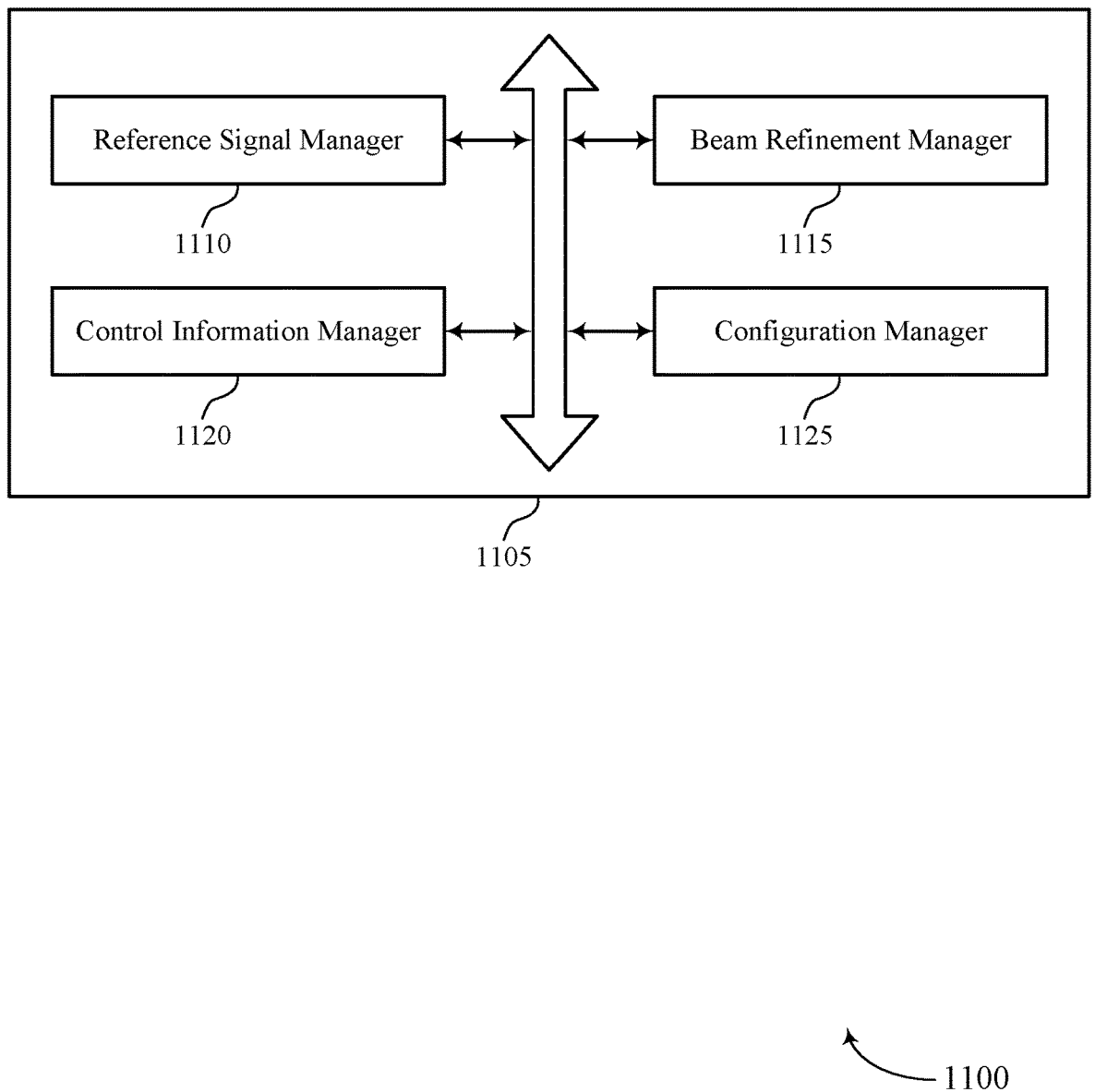
FIG. 11 shows a block diagram of a communications manager that supports beam update techniques in wireless communications in accordance with aspects of the present disclosure.

FIG. 11 shows a block diagram 1100 of a communications manager 1105 that supports beam update techniques in wireless communications in accordance with aspects of the present disclosure. The communications manager 1105 may be an example of aspects of a communications manager 915, a communications manager 1015, or a communications manager 1210 described herein. The communications manager 1105 may include a reference signal manager 1110, a beam refinement manager 1115, a control information manager 1120, and a configuration manager 1125. Each of these components may communicate, directly or indirectly, with one another (e.g., via one or more buses).

The reference signal manager 1110 may transmit a reference signal to a receiving device using a first set of beamforming parameters determined based on a beam training procedure between the transmitting device and the receiving device. In some examples, the reference signal manager 1110 may identify a first set of beamforming parameters determined based on a beam training procedure between a transmitting device and the receiving device.

The beam refinement manager 1115 may determine, based on a beam refinement procedure at the transmitting device, a refined set of beamforming parameters for a data communication to the receiving device. In some examples, the beam refinement manager 1115 may receive, from the transmitting device, an indication of a difference between the first set of beamforming parameters and a refined set of beamforming parameters that are used by the transmitting device for a data communication to the receiving device. In some examples, the beam refinement manager 1115 may receive the data communication from the transmitting device based on the indicated difference between the first set of beamforming parameters and the refined set of beamforming parameters.

In some examples, the beam refinement manager 1115 may receive, from the receiving device, a channel state information report and an indication of a quasi-co-location assumption used to determine one or more channel state information parameters of the channel state information report, and where the refined set of beamforming parameters is based on the channel state information report and the indication of the quasi-co-location assumption.

In some examples, the beam refinement manager 1115 may transmit the data communication to the receiving device using the refined set of beamforming parameters. In some examples, the beam refinement manager 1115 may receive the data communication from the transmitting device using the refined set of beamforming parameters.

In some cases, the first set of beamforming parameters are QCL parameters and where the difference between the first set of beamforming parameters and the refined set of beamforming parameters include a difference in one or more of the QCL parameters. In some cases, the QCL parameters include one or more of QCL type A parameters, QCL type B parameters, QCL type C parameters, or QCL type D parameters. In some cases, the difference in one or more QCL parameters includes an explicit difference value or an implicit indication of a difference based on one or more preconfigured differences in the one or more QCL parameters.

The control information manager 1120 may transmit an indication of a difference between the first set of beamforming parameters and the refined set of beamforming parameters to the receiving device. In some examples, the control information manager 1120 may transmit control information associated with the data communication that includes the indication of the difference between the first set of beamforming parameters and the refined set of beamforming parameters to the receiving device.

In some examples, the control information manager 1120 may receive control information associated with the data communication that includes the indication of the difference between the first set of beamforming parameters and the refined set of beamforming parameters to the receiving device. In some cases, the transmitting device is a base station, and the control information includes downlink control information transmitted to a user equipment. In some cases, the transmitting device is a user equipment, and the control information includes uplink control information transmitted to a base station. In some cases, the control information includes a MAC-CE that indicates the difference between the first set of beamforming parameters and the refined set of beamforming parameters to the receiving device.

The configuration manager 1125 may exchange configuration information with the receiving device, the configuration information including one or more configured difference values, and where the indication of the difference provides an indication of the one or more configured difference values. In some cases, the configuration information is exchanged via radio resource control signaling.

Figure 12:
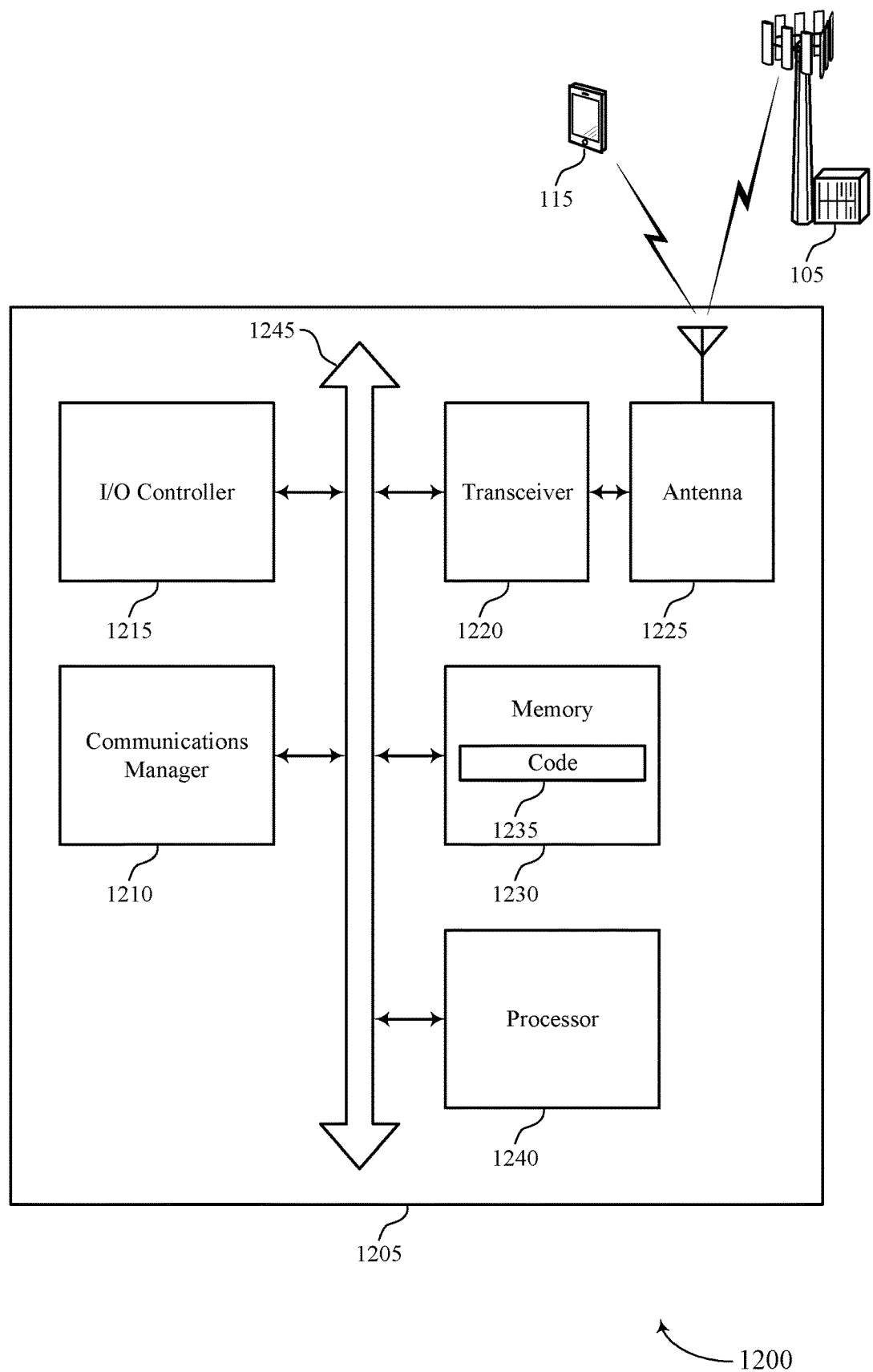
FIG. 12 shows a diagram of a system including a user equipment (UE) that supports beam update techniques in wireless communications in accordance with aspects of the present disclosure.

FIG. 12 shows a diagram of a system 1200 including a device 1205 that supports beam update techniques in wireless communications in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, a transceiver 1220, an antenna 1225, memory 1230, a processor 1240, and an I/O controller 1215. These components may be in electronic communication via one or more buses (e.g., bus 1245).

The communications manager 1210 may transmit a reference signal to a receiving device using a first set of beamforming parameters determined based on a beam training procedure between the transmitting device and the receiving device, determine, based on a beam refinement procedure at the transmitting device, a refined set of beamforming parameters for a data communication to the receiving device, and transmit an indication of a difference between the first set of beamforming parameters and the refined set of beamforming parameters to the receiving device.

The communications manager 1210 may also identify a first set of beamforming parameters determined based on a beam training procedure between a transmitting device and the receiving device, receive, from the transmitting device, an indication of a difference between the first set of beamforming parameters and a refined set of beamforming parameters that are used by the transmitting device for a data communication to the receiving device, and receive the data communication from the transmitting device based on the indicated difference between the first set of beamforming parameters and the refined set of beamforming parameters.

Transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting beam update techniques in wireless communications).

Based on providing additional signaling that indicates an update to one or more beamforming parameters, a processor 1240 of a base station 105 may efficiently perform beam refinement procedures. As such, when the beamforming parameters are transparent to a corresponding device as opposed through a TCI update, the processor may be ready to respond more efficiently through the reduction of a ramp up in processing power.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
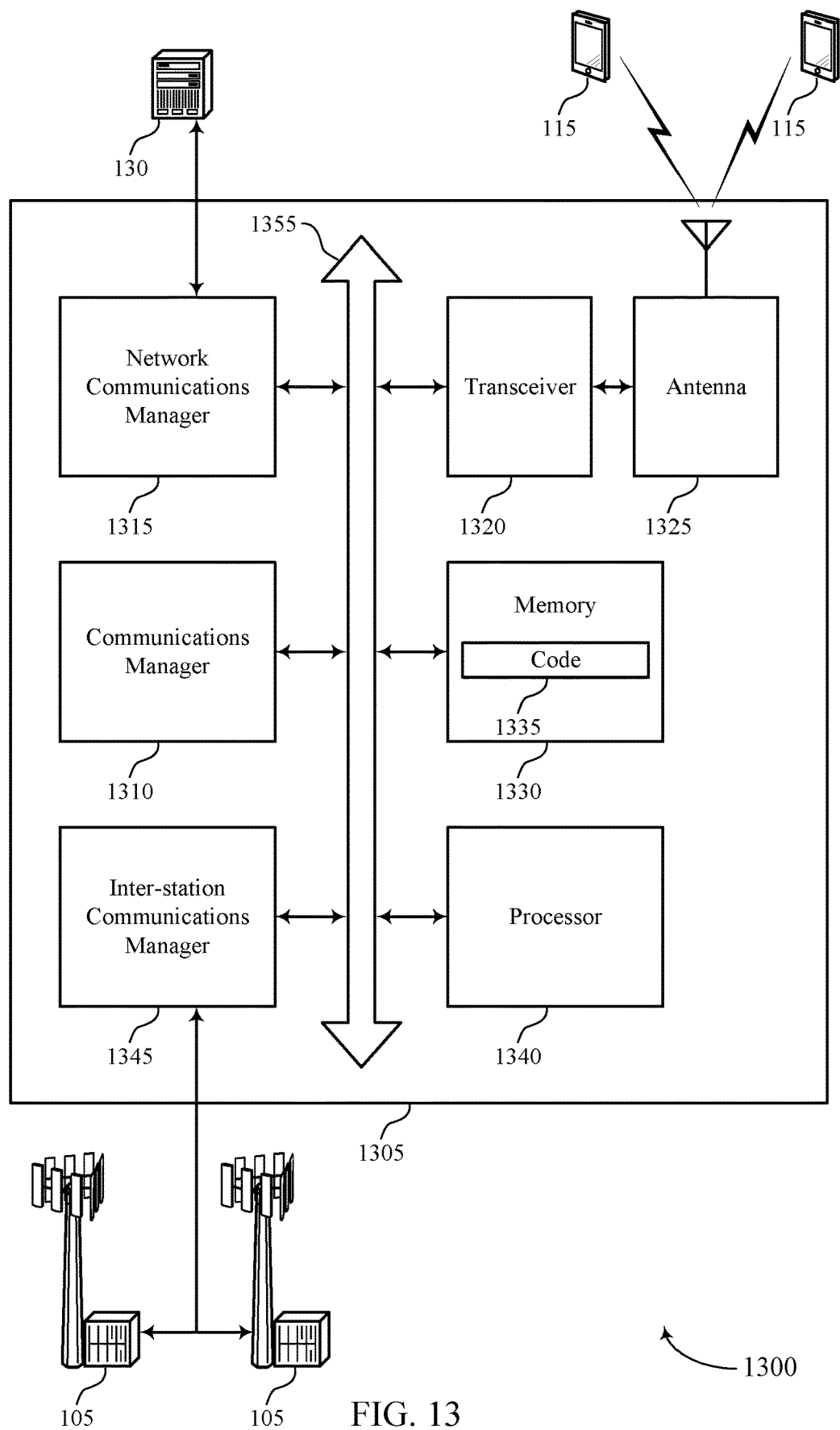
FIG. 13 shows a diagram of a system including a base station that supports beam update techniques in wireless communications in accordance with aspects of the present disclosure.

FIG. 13 shows a diagram of a system 1300 including a device 1305 that supports beam update techniques in wireless communications in accordance with aspects of the present disclosure. The device 1305 may be an example of or include the components of device 905, device 1005, or a base station 105 as described herein. The device 1305 may include components for bi-directional voice and data communications including components for transmitting and receiving communications, including a communications manager 1310, a network communications manager 1350, a transceiver 1320, an antenna 1325, memory 1330, a processor 1340, and an inter-station communications manager 1355. These components may be in electronic communication via one or more buses (e.g., bus 1345).

The communications manager 1310 may transmit a reference signal to a receiving device using a first set of beamforming parameters determined based on a beam training procedure between the transmitting device and the receiving device, determine, based on a beam refinement procedure at the transmitting device, a refined set of beamforming parameters for a data communication to the receiving device, and transmit an indication of a difference between the first set of beamforming parameters and the refined set of beamforming parameters to the receiving device.

The communications manager 1310 may also identify a first set of beamforming parameters determined based on a beam training procedure between a transmitting device and the receiving device, receive, from the transmitting device, an indication of a difference between the first set of beamforming parameters and a refined set of beamforming parameters that are used by the transmitting device for a data communication to the receiving device, and receive the data communication from the transmitting device based on the indicated difference between the first set of beamforming parameters and the refined set of beamforming parameters.

Network communications manager 1350 may manage communications with the core network (e.g., via one or more wired backhaul links). For example, the network communications manager 1350 may manage the transfer of data communications for client devices, such as one or more UEs 115.

Transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting beam update techniques in wireless communications).

Inter-station communications manager 1355 may manage communications with other base station 105, and may include a controller or scheduler for controlling communications with UEs 115 in cooperation with other base stations 105. For example, the inter-station communications manager 1355 may coordinate scheduling for transmissions to UEs 115 for various interference mitigation techniques such as beamforming or joint transmission. In some examples, inter-station communications manager 1355 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
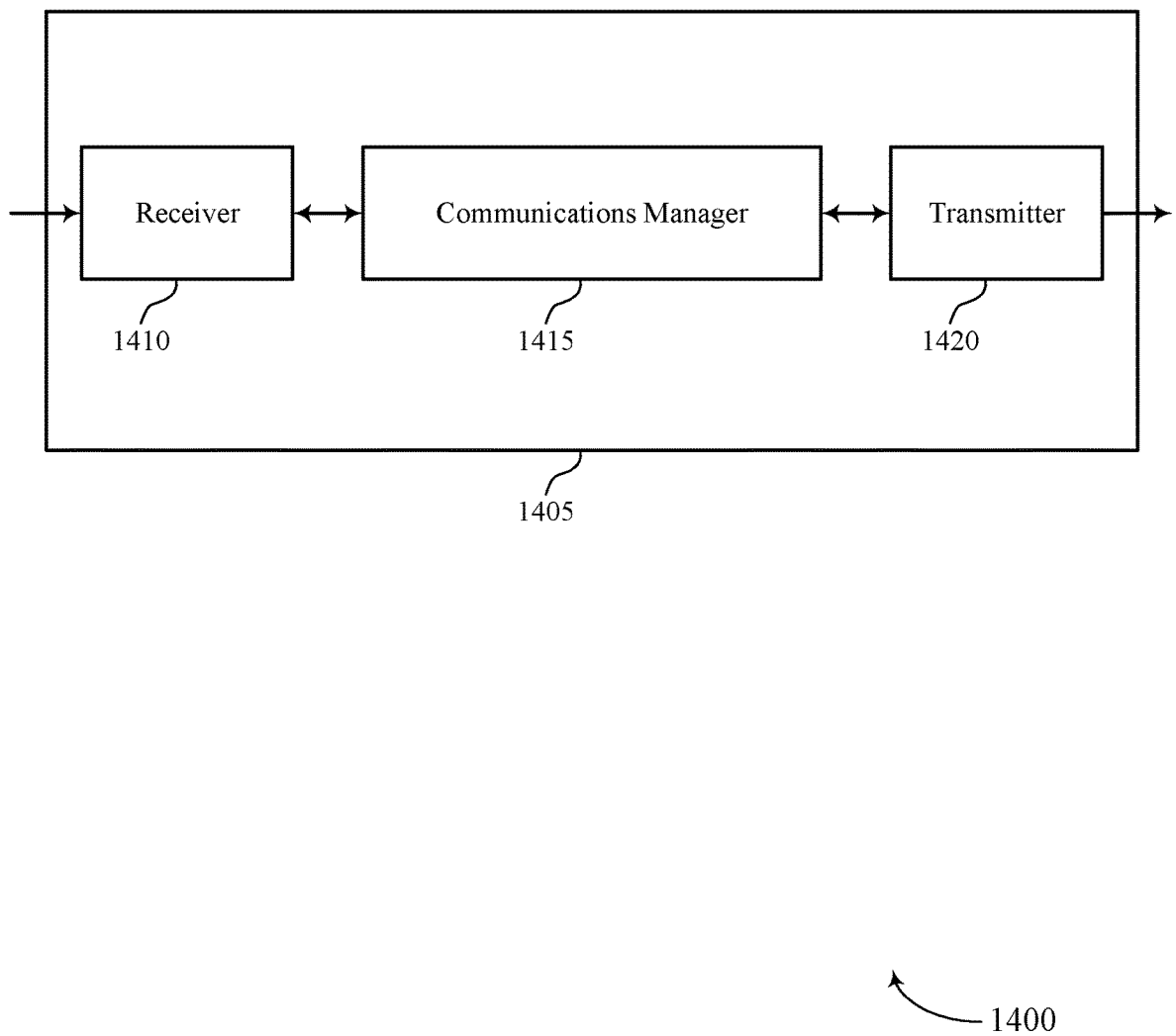
FIGS. 14 and 15 show block diagrams of devices that support beam update techniques in wireless communications in accordance with aspects of the present disclosure.

FIG. 14 shows a block diagram 1400 of a device 1405 that supports beam update techniques in wireless communications in accordance with aspects of the present disclosure.

The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to beam update techniques in wireless communications, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may transmit a reference signal to a UE using a first set of beamforming parameters, receive, from the UE, a channel state information report and an indication of one or more of a second set of beamforming parameters or a third set of beamforming parameters used by the UE to determine one or more channel state information parameters that are included in the channel state information report, determine, based on the channel state information report and the indication, a refined first set of beamforming parameters for a data communication to the UE, and transmit an indication of a difference between the first set of beamforming parameters and the refined first set of beamforming parameters to the UE. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver component. For example, the transmitter 1420 may be an example of aspects of the transceiver 1720 described with reference to FIG. 17. The transmitter 1420 may utilize a single antenna or a set of antennas.

Figure 15:
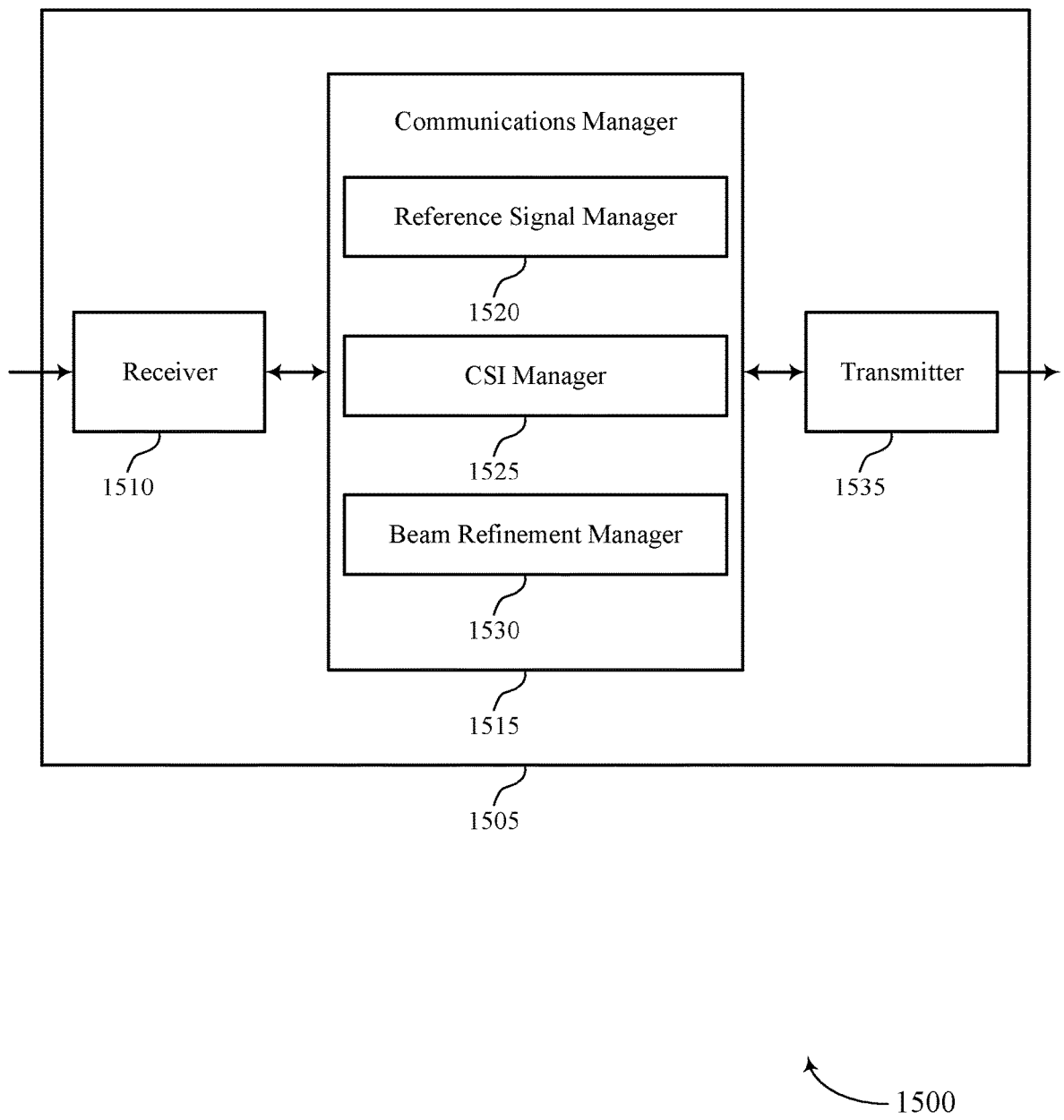

FIG. 15 shows a block diagram 1500 of a device 1505 that supports beam update techniques in wireless communications in accordance with aspects of the present disclosure. The device 1505 may be an example of aspects of a device 1405, or a base station 105 as described herein. The device 1505 may include a receiver 1510, a communications manager 1515, and a transmitter 1535. The device 1505 may also include a processor. Each of these components may be in communication with one another (e.g., via one or more buses).

The receiver 1510 may receive information such as packets, user data, or control information associated with various information channels (e.g., control channels, data channels, and information related to beam update techniques in wireless communications, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a reference signal manager 1520, a CSI manager 1525, and a beam refinement manager 1530. The communications manager 1515 may be an example of aspects of the communications manager 1710 described herein.

The reference signal manager 1520 may transmit a reference signal to a UE using a first set of beamforming parameters.

The CSI manager 1525 may receive, from the UE, a channel state information report and an indication of one or more of a second set of beamforming parameters or a third set of beamforming parameters used by the UE to determine one or more channel state information parameters that are included in the channel state information report.

The beam refinement manager 1530 may determine, based on the channel state information report and the indication, a refined first set of beamforming parameters for a data communication to the UE and transmit an indication of a difference between the first set of beamforming parameters and the refined first set of beamforming parameters to the UE.

The transmitter 1535 may transmit signals generated by other components of the device 1505. In some examples, the transmitter 1535 may be collocated with a receiver 1510 in a transceiver component. For example, the transmitter 1535 may be an example of aspects of the transceiver 1720 described with reference to FIG. 17. The transmitter 1535 may utilize a single antenna or a set of antennas.

Figure 16:
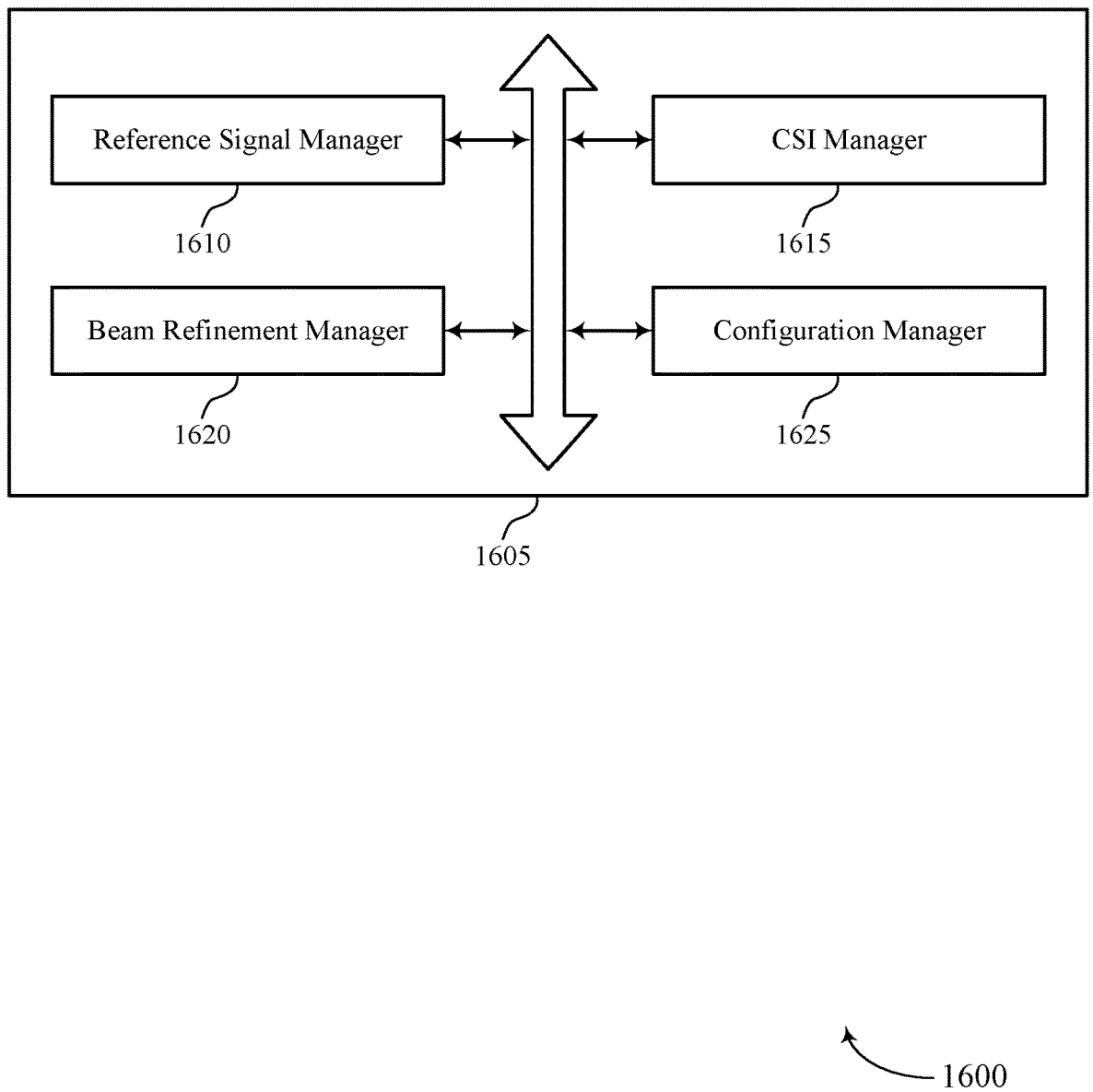
FIG. 16 shows a block diagram of a communications manager that supports beam update techniques in wireless communications in accordance with aspects of the present disclosure.

FIG. 16 shows a block diagram 1600 of a communications manager 1605 that supports beam update techniques in wireless communications in accordance with aspects of the present disclosure. The communications manager 1605 may be an example of aspects of a communications manager 1415, a communications manager 1515, or a communications manager 1710 described herein. The communications manager 1605 may include a reference signal manager 1610, a CSI manager 1615, a beam refinement manager 1620, and a configuration manager 1625. Each of these components may communicate, directly or indirectly, with one another (e.g., via one or more buses).

The reference signal manager 1610 may transmit a reference signal to a UE using a first set of beamforming parameters.

The CSI manager 1615 may receive, from the UE, a channel state information report and an indication of one or more of a second set of beamforming parameters or a third set of beamforming parameters used by the UE to determine one or more channel state information parameters that are included in the channel state information report.

The beam refinement manager 1620 may determine, based on the channel state information report and the indication, a refined first set of beamforming parameters for a data communication to the UE. In some examples, the beam refinement manager 1620 may transmit an indication of a difference between the first set of beamforming parameters and the refined first set of beamforming parameters to the UE. In some cases, the second set of beamforming parameters correspond to a QCL assumption of the UE that is associated with the reference signal, and the third set of beamforming parameters include one or more parameters determined based on a receive beam refinement procedure at the UE.

In some cases, the indication of one or more of the second set of beamforming parameters or the third set of beamforming parameters indicates one or more of a receive beam used at the UE to receive the reference signal, a codebook assumption used at the UE to determine the one or more channel state information parameters, an indication of a difference between the second set of beamforming parameters and the third set of beamforming parameters, or any combinations thereof.

In some cases, the indication of the second set of beamforming parameters provides QCL parameters that include one or more of QCL type A parameters, QCL type B parameters, QCL type C parameters, or QCL type D parameters. In some cases, the indication of the refined first set of beamforming parameters further indicates a difference in one or more of the QCL parameters relative to the first set of beamforming parameters.

The configuration manager 1625 may configure, via radio resource control signaling, the UE to transmit the indication of one or more of the second set of beamforming parameters or the third set of beamforming parameters.

Figure 17:
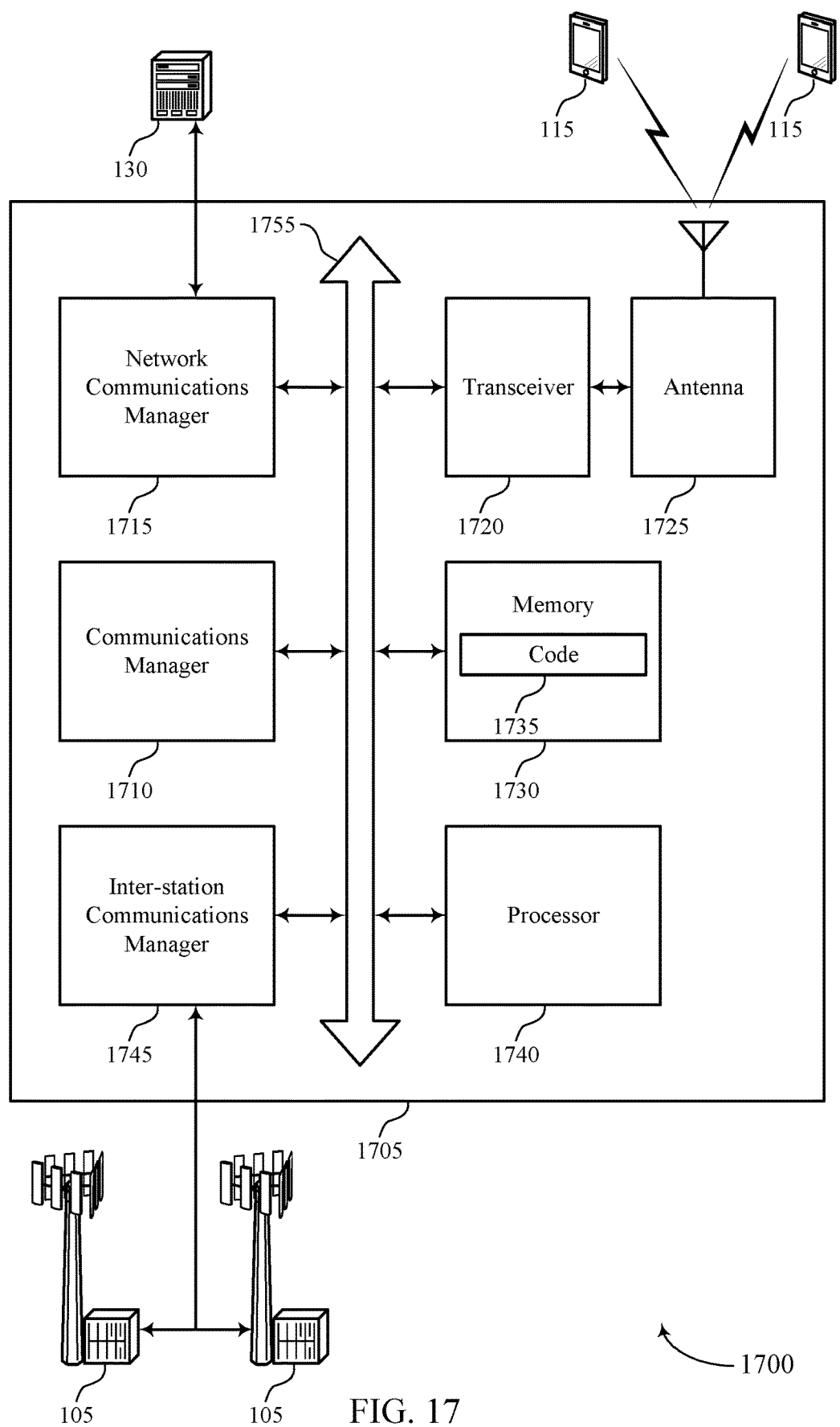
FIG. 17 shows a diagram of a system including a device that supports beam update techniques in wireless communications in accordance with aspects of the present disclosure.

FIG. 17 shows a diagram of a system 1700 including a device 1705 that supports beam update techniques in wireless communications in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1755).

The communications manager 1710 may transmit a reference signal to a UE using a first set of beamforming parameters, receive, from the UE, a channel state information report and an indication of one or more of a second set of beamforming parameters or a third set of beamforming parameters used by the UE to determine one or more channel state information parameters that are included in the channel state information report, determine, based on the channel state information report and the indication, a refined first set of beamforming parameters for a data communication to the UE, and transmit an indication of a difference between the first set of beamforming parameters and the refined first set of beamforming parameters to the UE.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting beam update techniques in wireless communications).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
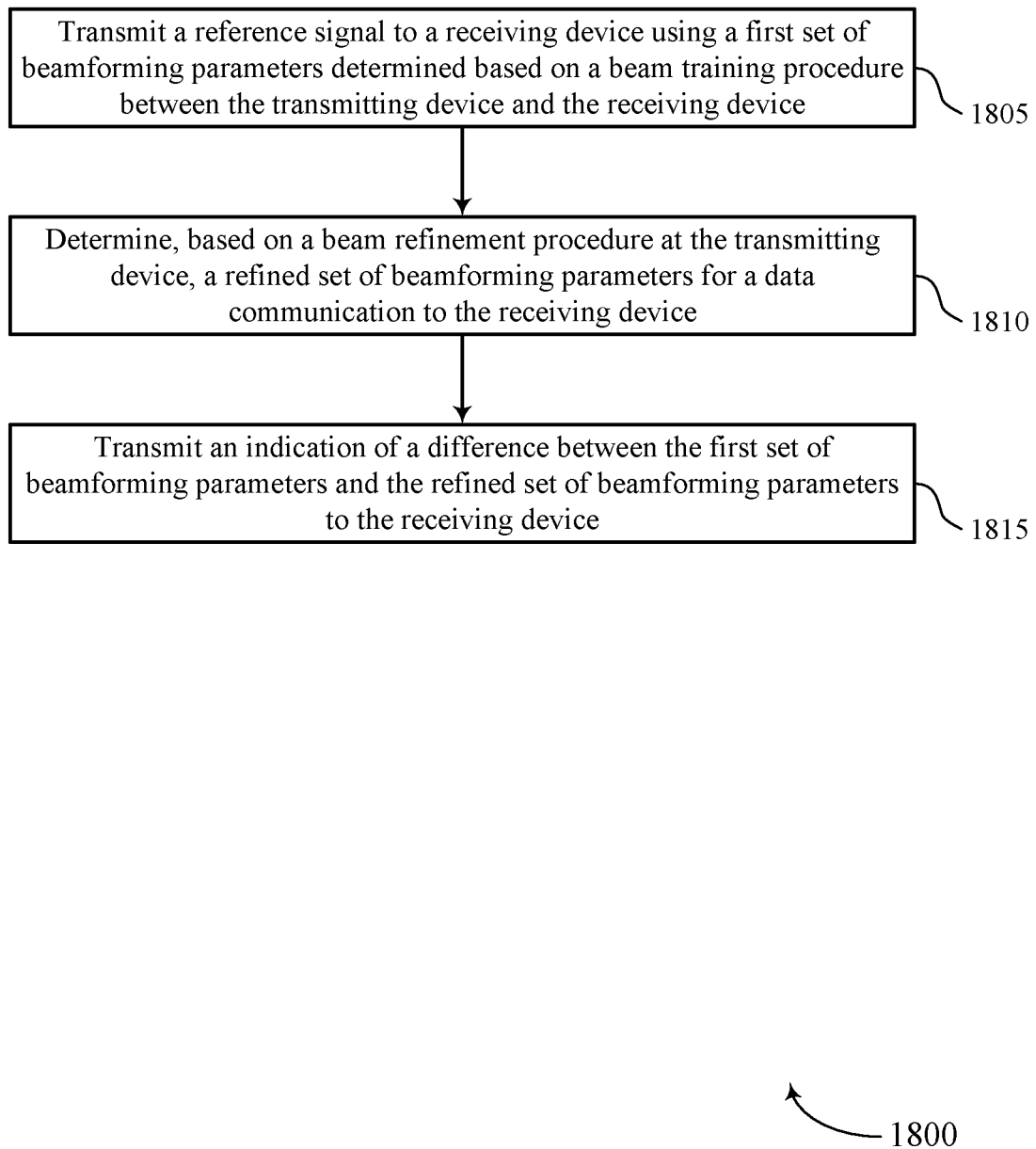
FIGS. 18 through 24 show flowcharts illustrating methods that support beam update techniques in wireless communications in accordance with aspects of the present disclosure.

FIG. 18 shows a flowchart illustrating a method 1800 that supports beam update techniques in wireless communications in accordance with aspects of the present disclosure. The operations of method 1800 may be implemented by a UE 115 or base station 105 or its components as described herein. For example, the operations of method 1800 may be performed by a communications manager as described with reference to FIGS. 9 through 13. In some examples, a UE or base station may execute a set of instructions to control the functional elements of the UE or base station to perform the functions described below. Additionally or alternatively, a UE or base station may perform aspects of the functions described below using special-purpose hardware.

At 1805, the UE or base station may transmit a reference signal to a receiving device using a first set of beamforming parameters determined based on a beam training procedure between the transmitting device and the receiving device. The operations of 1805 may be performed according to the methods described herein. In some examples, aspects of the operations of 1805 may be performed by a reference signal manager as described with reference to FIGS. 9 through 13.

At 1810, the UE or base station may determine, based on a beam refinement procedure at the transmitting device, a refined set of beamforming parameters for a data communication to the receiving device. The operations of 1810 may be performed according to the methods described herein. In some examples, aspects of the operations of 1810 may be performed by a beam refinement manager as described with reference to FIGS. 9 through 13.

At 1815, the UE or base station may transmit an indication of a difference between the first set of beamforming parameters and the refined set of beamforming parameters to the receiving device. The operations of 1815 may be performed according to the methods described herein. In some examples, aspects of the operations of 1815 may be performed by a control information manager as described with reference to FIGS. 9 through 13. In some cases, the UE or base station may transmit control information associated with the data communication that includes the indication of the difference between the first set of beamforming parameters and the refined set of beamforming parameters to the receiving device. In some cases, the transmitting device is a base station, and the control information includes downlink control information transmitted to a user equipment. In some cases, the transmitting device is a user equipment, and the control information includes uplink control information transmitted to a base station. In some cases, the control information includes a MAC-CE that indicates the difference between the first set of beamforming parameters and the refined set of beamforming parameters to the receiving device.

In some cases, the first set of beamforming parameters are QCL parameters and where the difference between the first set of beamforming parameters and the refined set of beamforming parameters include a difference in one or more of the QCL parameters. In some cases, the QCL parameters include one or more of QCL type A parameters, QCL type B parameters, QCL type C parameters, or QCL type D parameters. In some cases, the difference in one or more QCL parameters includes an explicit difference value or an implicit indication of a difference based on one or more preconfigured differences in the one or more QCL parameters.

Figure 19:
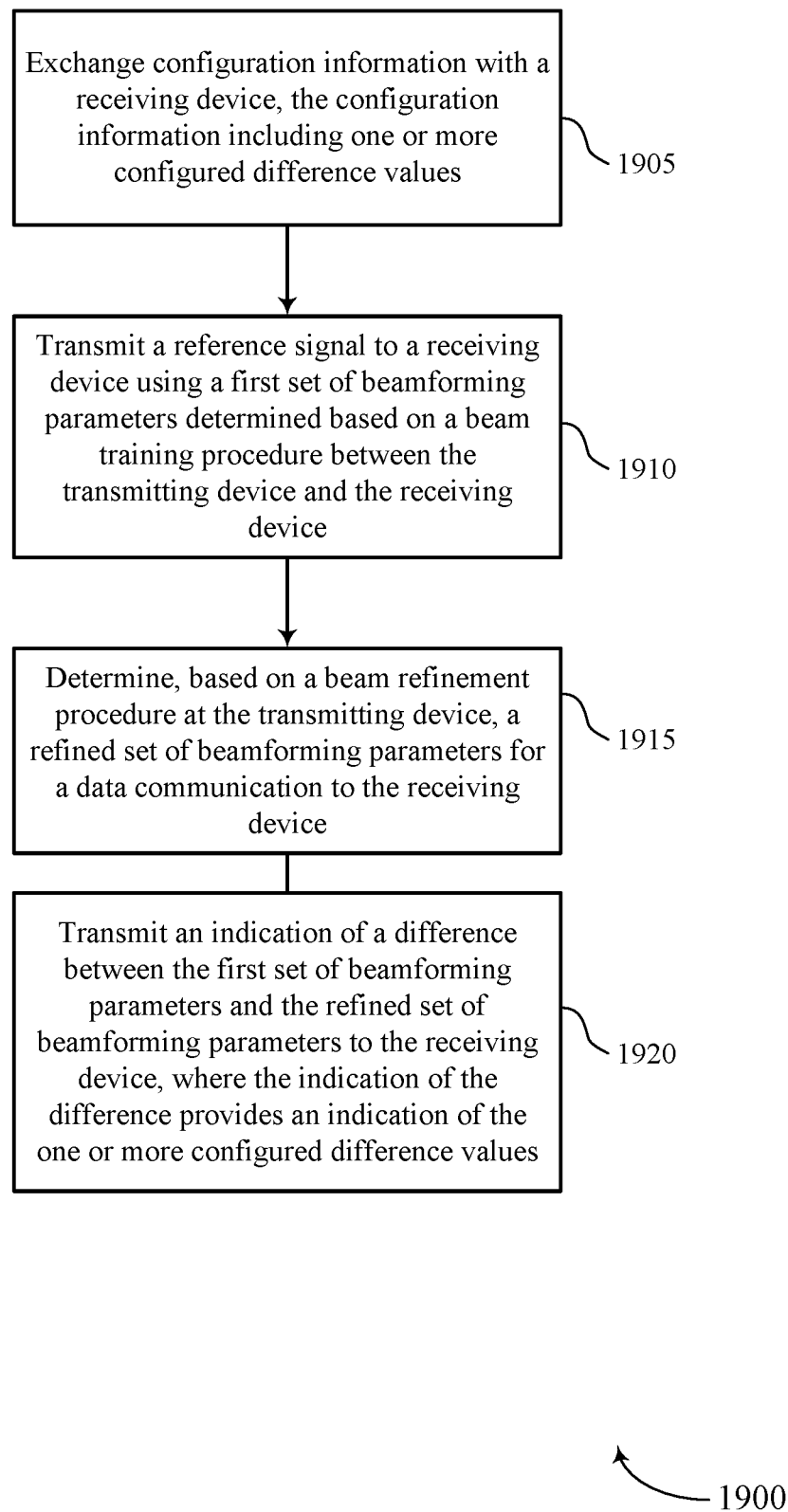

FIG. 19 shows a flowchart illustrating a method 1900 that supports beam update techniques in wireless communications in accordance with aspects of the present disclosure. The operations of method 1900 may be implemented by a UE 115 or base station 105 or its components as described herein. For example, the operations of method 1900 may be performed by a communications manager as described with reference to FIGS. 9 through 13. In some examples, a UE or base station may execute a set of instructions to control the functional elements of the UE or base station to perform the functions described below. Additionally or alternatively, a UE or base station may perform aspects of the functions described below using special-purpose hardware.

At 1905, the UE or base station may exchange configuration information with the receiving device, the configuration information including one or more configured difference values. The operations of 1905 may be performed according to the methods described herein. In some examples, aspects of the operations of 1905 may be performed by a configuration manager as described with reference to FIGS. 9 through 13. In some cases, the configuration information is exchanged via radio resource control signaling.

At 1910, the UE or base station may transmit a reference signal to a receiving device using a first set of beamforming parameters determined based on a beam training procedure between the transmitting device and the receiving device. The operations of 1910 may be performed according to the methods described herein. In some examples, aspects of the operations of 1910 may be performed by a reference signal manager as described with reference to FIGS. 9 through 13.

At 1915, the UE or base station may determine, based on a beam refinement procedure at the transmitting device, a refined set of beamforming parameters for a data communication to the receiving device. The operations of 1915 may be performed according to the methods described herein. In some examples, aspects of the operations of 1915 may be performed by a beam refinement manager as described with reference to FIGS. 9 through 13.

At 1920, the UE or base station may transmit an indication of a difference between the first set of beamforming parameters and the refined set of beamforming parameters to the receiving device, where the indication of the difference provides an indication of the one or more configured difference values. The operations of 1920 may be performed according to the methods described herein. In some examples, aspects of the operations of 1920 may be performed by a control information manager as described with reference to FIGS. 9 through 13.

Figure 20:
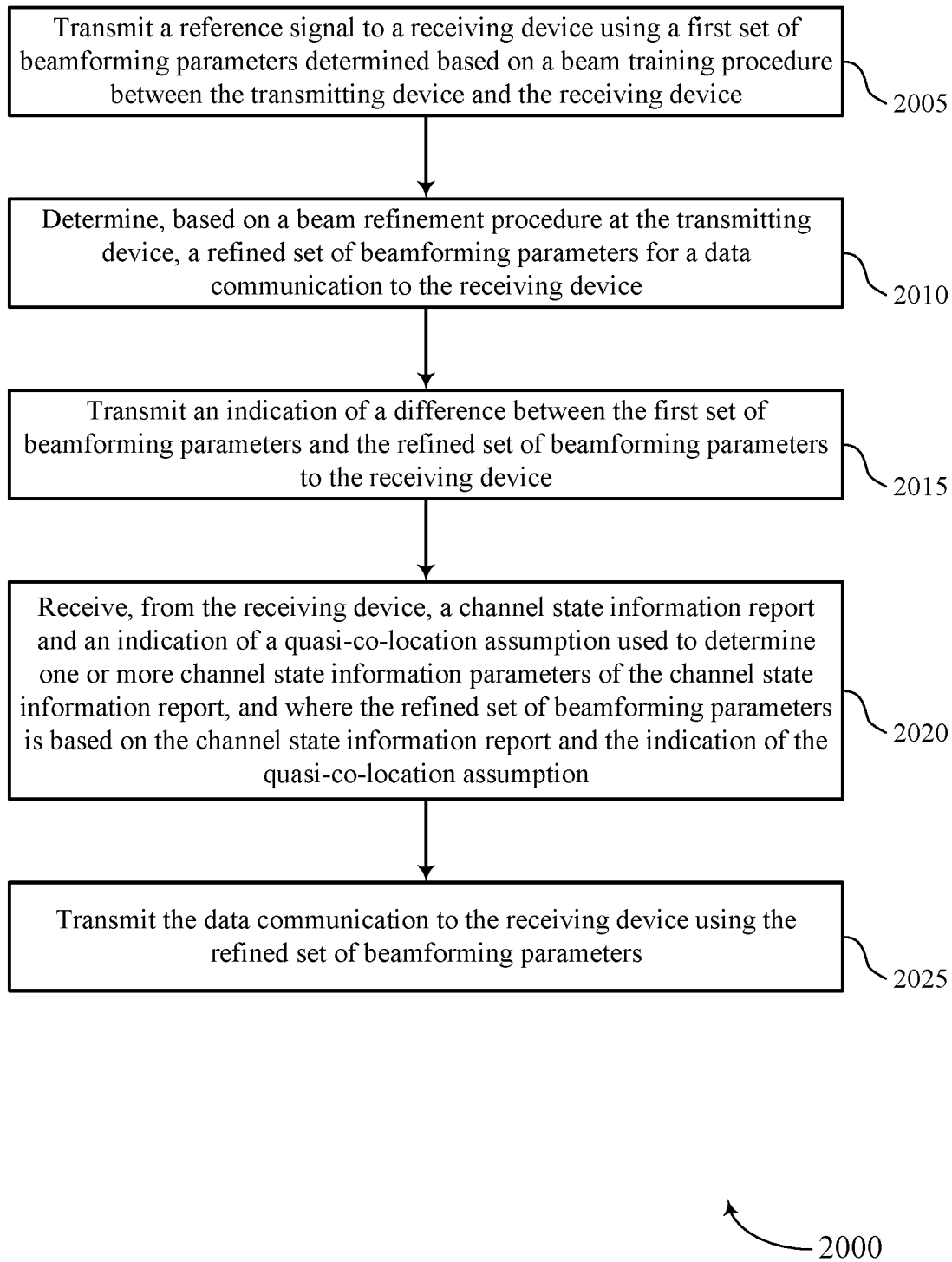

FIG. 20 shows a flowchart illustrating a method 2000 that supports beam update techniques in wireless communications in accordance with aspects of the present disclosure. The operations of method 2000 may be implemented by a UE 115 or base station 105 or its components as described herein. For example, the operations of method 2000 may be performed by a communications manager as described with reference to FIGS. 9 through 13. In some examples, a UE or base station may execute a set of instructions to control the functional elements of the UE or base station to perform the functions described below. Additionally or alternatively, a UE or base station may perform aspects of the functions described below using special-purpose hardware.

At 2005, the UE or base station may transmit a reference signal to a receiving device using a first set of beamforming parameters determined based on a beam training procedure between the transmitting device and the receiving device. The operations of 2005 may be performed according to the methods described herein. In some examples, aspects of the operations of 2005 may be performed by a reference signal manager as described with reference to FIGS. 9 through 13.

At 2010, the UE or base station may determine, based on a beam refinement procedure at the transmitting device, a refined set of beamforming parameters for a data communication to the receiving device. The operations of 2010 may be performed according to the methods described herein. In some examples, aspects of the operations of 2010 may be performed by a beam refinement manager as described with reference to FIGS. 9 through 13.

At 2015, the UE or base station may transmit an indication of a difference between the first set of beamforming parameters and the refined set of beamforming parameters to the receiving device. The operations of 2015 may be performed according to the methods described herein. In some examples, aspects of the operations of 2015 may be performed by a control information manager as described with reference to FIGS. 9 through 13.

At 2020, the UE or base station may receive, from the receiving device, a channel state information report and an indication of a quasi-co-location assumption used to determine one or more channel state information parameters of the channel state information report, and where the refined set of beamforming parameters is based on the channel state information report and the indication of the quasi-co-location assumption. The operations of 2020 may be performed according to the methods described herein. In some examples, aspects of the operations of 2020 may be performed by a beam refinement manager as described with reference to FIGS. 9 through 13.

At 2025, the UE or base station may transmit the data communication to the receiving device using the refined set of beamforming parameters. The operations of 2025 may be performed according to the methods described herein. In some examples, aspects of the operations of 2025 may be performed by a beam refinement manager as described with reference to FIGS. 9 through 13.

Figure 21:
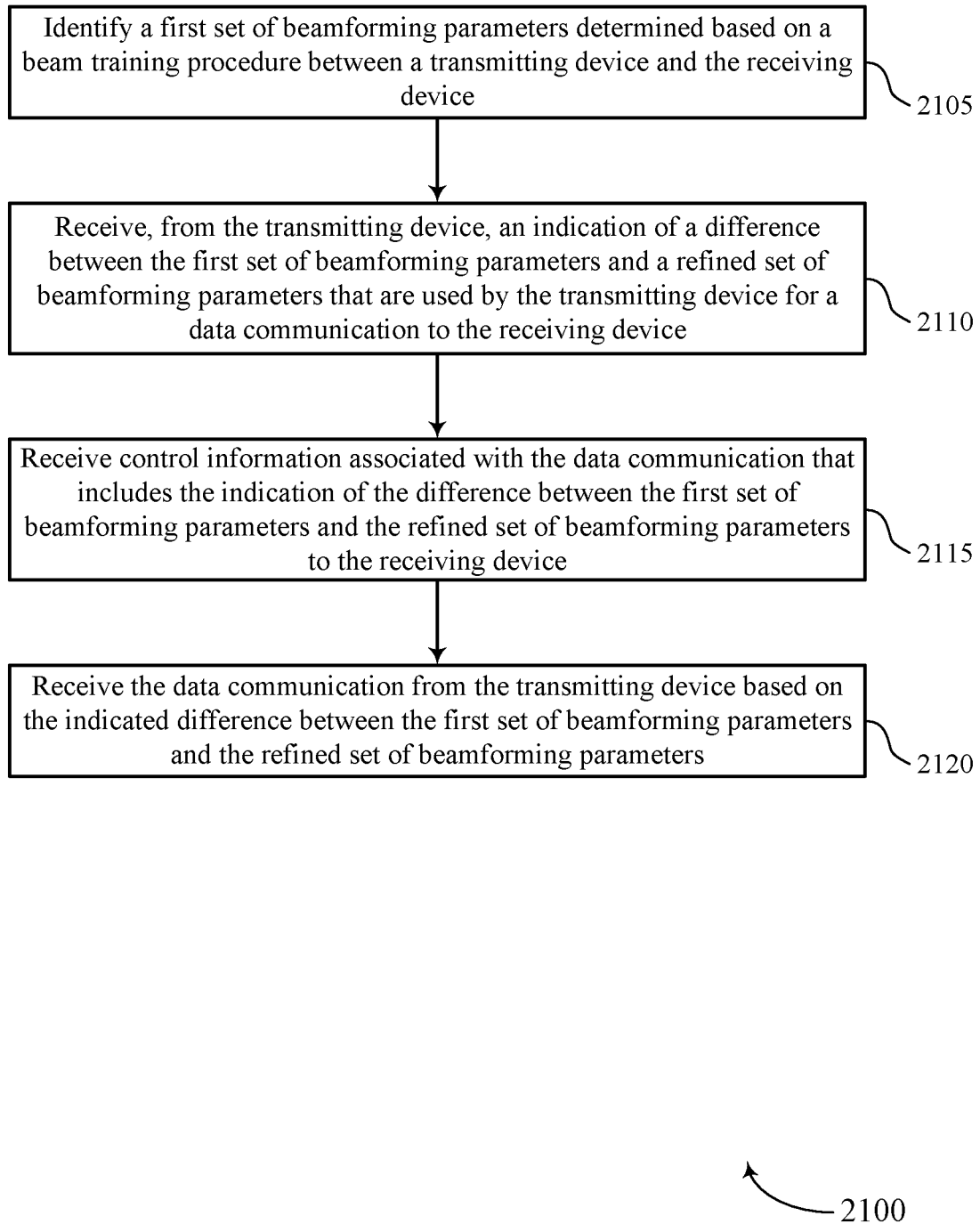

FIG. 21 shows a flowchart illustrating a method 2100 that supports beam update techniques in wireless communications in accordance with aspects of the present disclosure. The operations of method 2100 may be implemented by a UE 115 or base station 105 or its components as described herein. For example, the operations of method 2100 may be performed by a communications manager as described with reference to FIGS. 9 through 13. In some examples, a UE or base station may execute a set of instructions to control the functional elements of the UE or base station to perform the functions described below. Additionally or alternatively, a UE or base station may perform aspects of the functions described below using special-purpose hardware.

At 2105, the UE or base station may identify a first set of beamforming parameters determined based on a beam training procedure between a transmitting device and the receiving device. The operations of 2105 may be performed according to the methods described herein. In some examples, aspects of the operations of 2105 may be performed by a reference signal manager as described with reference to FIGS. 9 through 13.

At 2110, the UE or base station may receive, from the transmitting device, an indication of a difference between the first set of beamforming parameters and a refined set of beamforming parameters that are used by the transmitting device for a data communication to the receiving device. The operations of 2110 may be performed according to the methods described herein. In some examples, aspects of the operations of 2110 may be performed by a beam refinement manager as described with reference to FIGS. 9 through 13.

At 2115, the UE or base station may receive control information associated with the data communication that includes the indication of the difference between the first set of beamforming parameters and the refined set of beamforming parameters to the receiving device. The operations of 2115 may be performed according to the methods described herein. In some examples, aspects of the operations of 2115 may be performed by a control information manager as described with reference to FIGS. 9 through 13.

At 2120, the UE or base station may receive the data communication from the transmitting device based on the indicated difference between the first set of beamforming parameters and the refined set of beamforming parameters. The operations of 2120 may be performed according to the methods described herein. In some examples, aspects of the operations of 2120 may be performed by a beam refinement manager as described with reference to FIGS. 9 through 13.

In some cases, the receiving device is a user equipment, and the control information includes downlink control information transmitted to the user equipment. In some cases, the receiving device is a base station, and the control information includes uplink control information transmitted to from a user equipment. In some cases, the control information includes a MAC-CE that indicates the difference between the first set of beamforming parameters and the refined set of beamforming parameters to the receiving device.

In some cases, the first set of beamforming parameters are QCL parameters and where the difference between the first set of beamforming parameters and the refined set of beamforming parameters include a difference in one or more of the QCL parameters. In some cases, the QCL parameters include one or more of QCL type A parameters, QCL type B parameters, QCL type C parameters, or QCL type D parameters. In some cases, the difference in one or more QCL parameters includes an explicit difference value or an implicit indication of a difference based on one or more preconfigured differences in the one or more QCL parameters.

Figure 22:
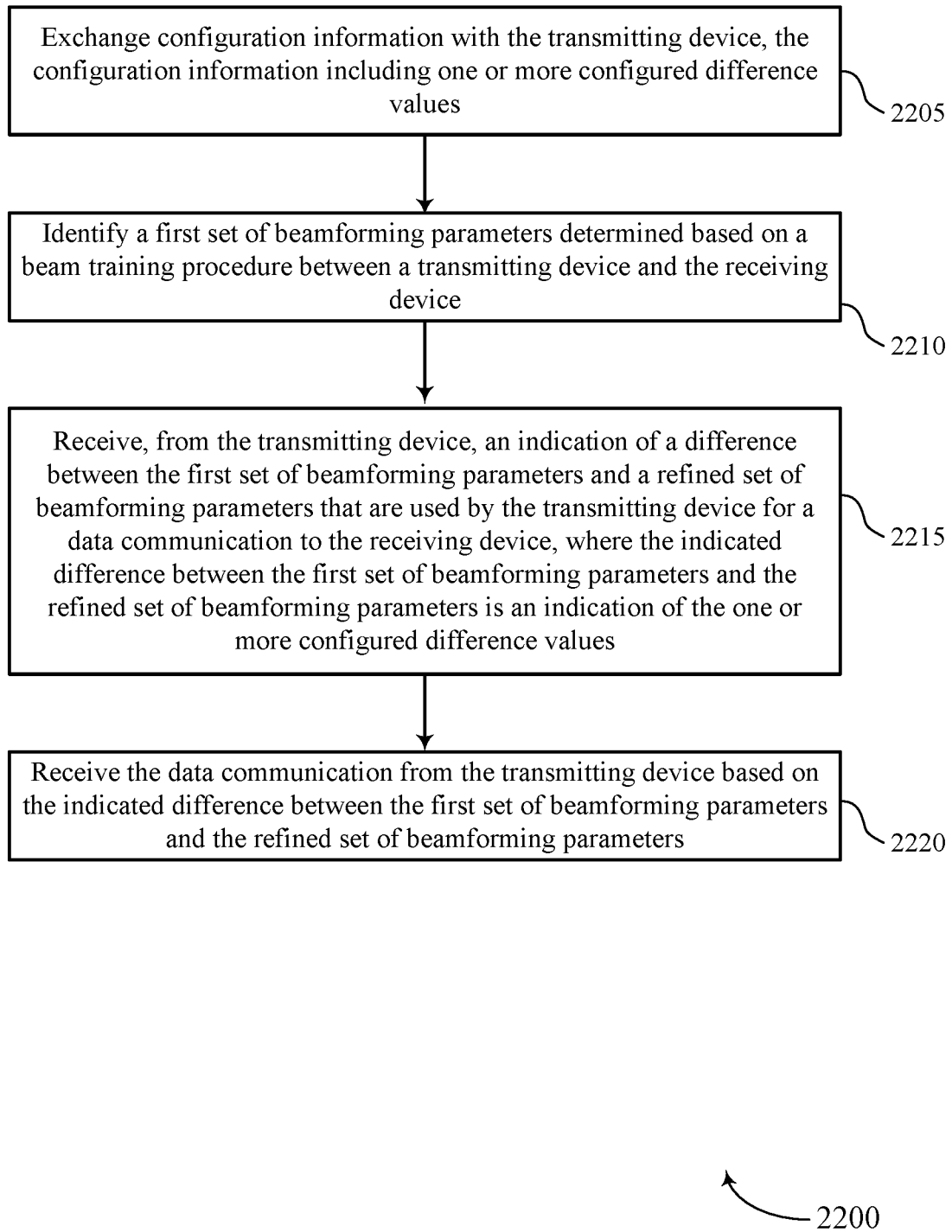

FIG. 22 shows a flowchart illustrating a method 2200 that supports beam update techniques in wireless communications in accordance with aspects of the present disclosure. The operations of method 2200 may be implemented by a UE 115 or base station 105 or its components as described herein. For example, the operations of method 2200 may be performed by a communications manager as described with reference to FIGS. 9 through 13. In some examples, a UE or base station may execute a set of instructions to control the functional elements of the UE or base station to perform the functions described below. Additionally or alternatively, a UE or base station may perform aspects of the functions described below using special-purpose hardware.

At 2205, the UE or base station may exchange configuration information with the transmitting device, the configuration information including one or more configured difference values. The operations of 2205 may be performed according to the methods described herein. In some examples, aspects of the operations of 2205 may be performed by a configuration manager as described with reference to FIGS. 9 through 13. In some cases, the configuration information is exchanged via radio resource control signaling.

At 2210, the UE or base station may identify a first set of beamforming parameters determined based on a beam training procedure between a transmitting device and the receiving device. The operations of 2210 may be performed according to the methods described herein. In some examples, aspects of the operations of 2210 may be performed by a reference signal manager as described with reference to FIGS. 9 through 13.

At 2215, the UE or base station may receive, from the transmitting device, an indication of a difference between the first set of beamforming parameters and a refined set of beamforming parameters that are used by the transmitting device for a data communication to the receiving device, where the indicated difference between the first set of beamforming parameters and the refined set of beamforming parameters is an indication of the one or more configured difference values. The operations of 2215 may be performed according to the methods described herein. In some examples, aspects of the operations of 2215 may be performed by a beam refinement manager as described with reference to FIGS. 9 through 13.

At 2220, the UE or base station may receive the data communication from the transmitting device based on the indicated difference between the first set of beamforming parameters and the refined set of beamforming parameters. The operations of 2220 may be performed according to the methods described herein. In some examples, aspects of the operations of 2220 may be performed by a beam refinement manager as described with reference to FIGS. 9 through 13.

Figure 23:
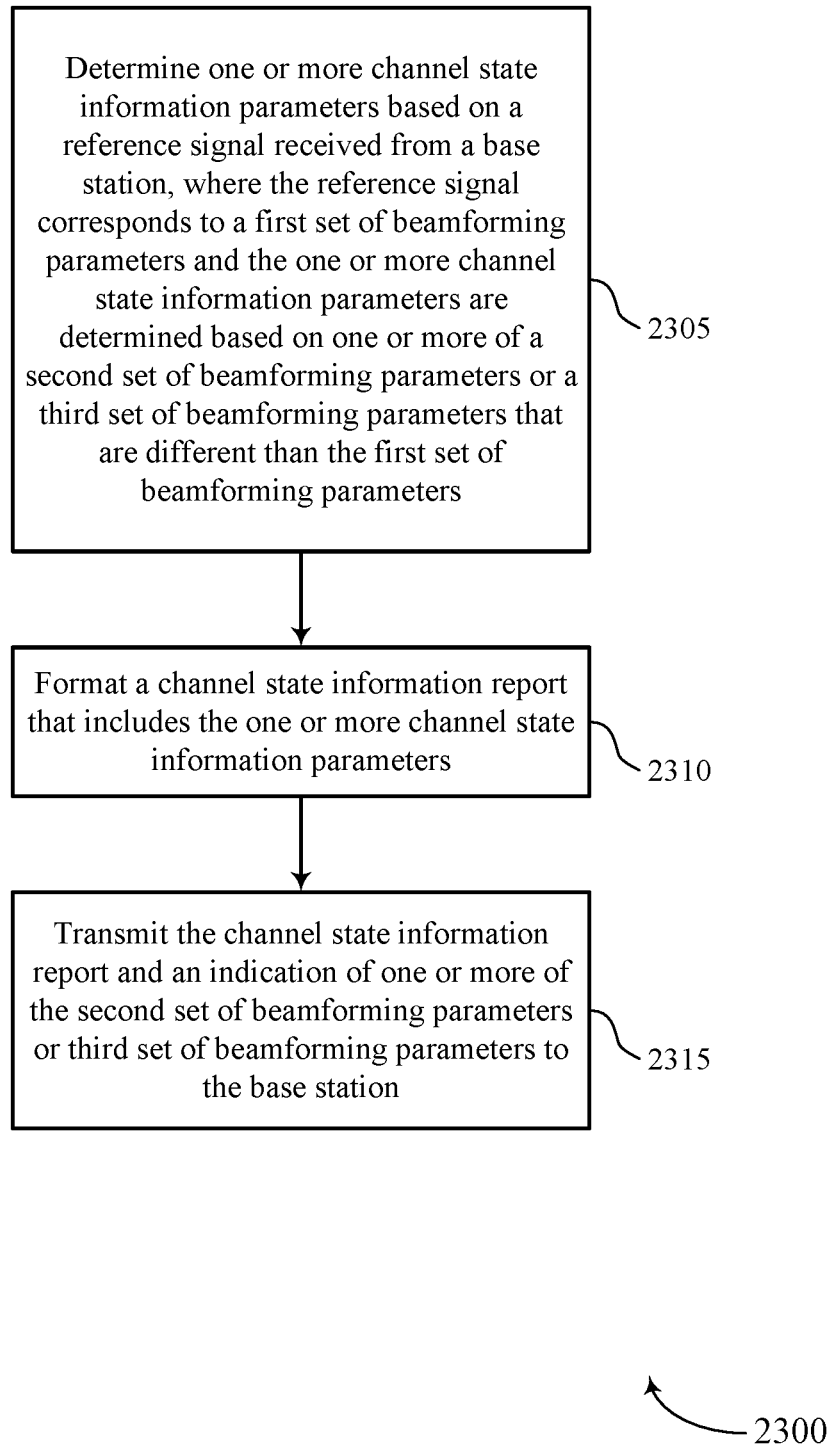

FIG. 23 shows a flowchart illustrating a method 2300 that supports beam update techniques in wireless communications in accordance with aspects of the present disclosure. The operations of method 2300 may be implemented by a UE 115 or its components as described herein. For example, the operations of method 2300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 2305, the UE may determine one or more channel state information parameters based on a reference signal received from a base station, where the reference signal corresponds to a first set of beamforming parameters and the one or more channel state information parameters are determined based on one or more of a second set of beamforming parameters or a third set of beamforming parameters that are different than the first set of beamforming parameters. The operations of 2305 may be performed according to the methods described herein. In some examples, aspects of the operations of 2305 may be performed by a reference signal manager as described with reference to FIGS. 5 through 8.

At 2310, the UE may format a channel state information report that includes the one or more channel state information parameters. The operations of 2310 may be performed according to the methods described herein. In some examples, aspects of the operations of 2310 may be performed by a CSI manager as described with reference to FIGS. 5 through 8.

At 2315, the UE may transmit the channel state information report and an indication of one or more of the second set of beamforming parameters or third set of beamforming parameters to the base station. The operations of 2315 may be performed according to the methods described herein. In some examples, aspects of the operations of 2315 may be performed by a CSI manager as described with reference to FIGS. 5 through 8.

Figure 24:
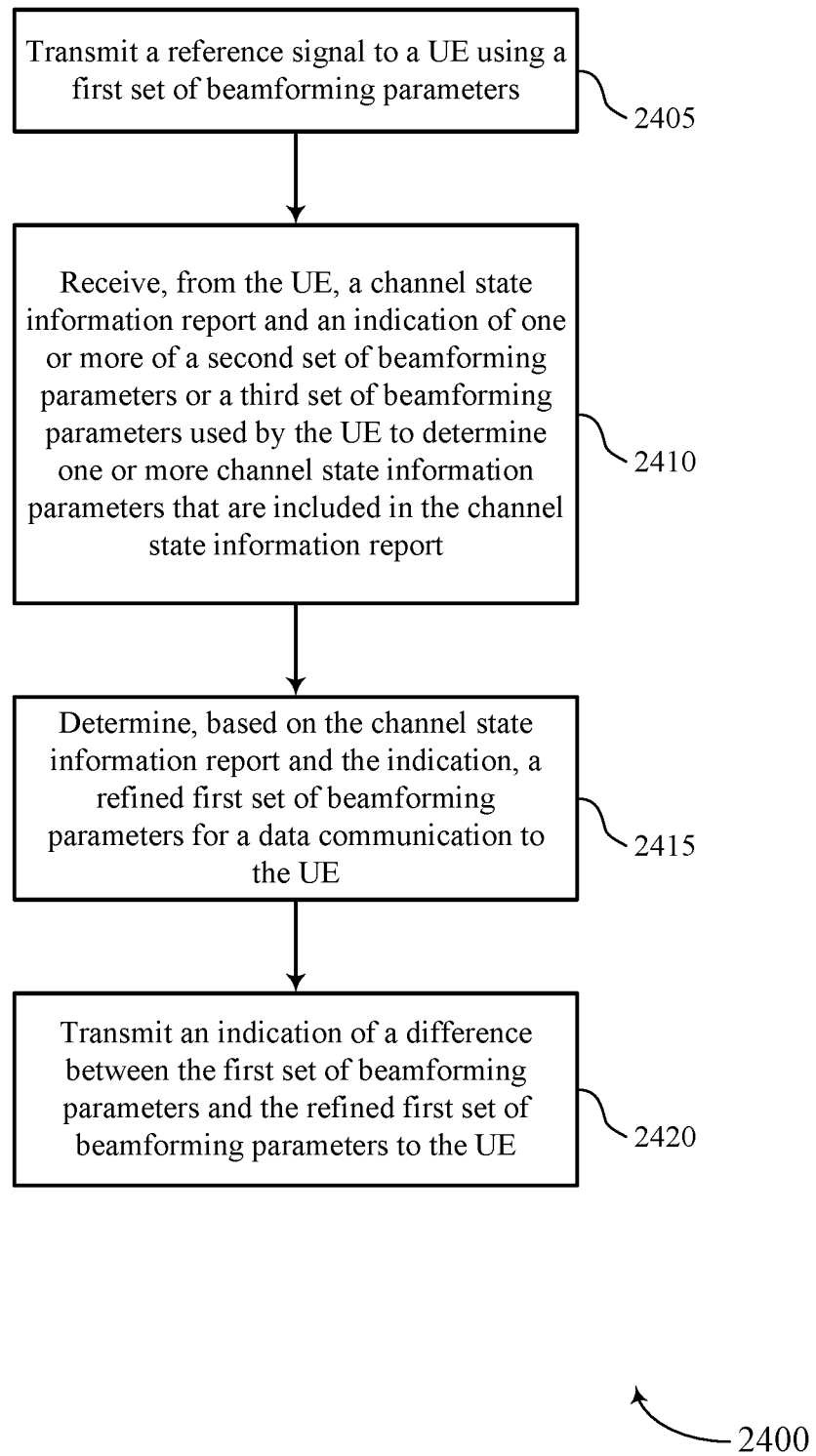

FIG. 24 shows a flowchart illustrating a method 2400 that supports beam update techniques in wireless communications in accordance with aspects of the present disclosure. The operations of method 2400 may be implemented by a base station 105 or its components as described herein. For example, the operations of method 2400 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2405, the base station may transmit a reference signal to a UE using a first set of beamforming parameters. The operations of 2405 may be performed according to the methods described herein. In some examples, aspects of the operations of 2405 may be performed by a reference signal manager as described with reference to FIGS. 14 through 17.

At 2410, the base station may receive, from the UE, a channel state information report and an indication of one or more of a second set of beamforming parameters or a third set of beamforming parameters used by the UE to determine one or more channel state information parameters that are included in the channel state information report. The operations of 2410 may be performed according to the methods described herein. In some examples, aspects of the operations of 2410 may be performed by a CSI manager as described with reference to FIGS. 14 through 17.

At 2415, the base station may determine, based on the channel state information report and the indication, a refined first set of beamforming parameters for a data communication to the UE. The operations of 2415 may be performed according to the methods described herein. In some examples, aspects of the operations of 2415 may be performed by a beam refinement manager as described with reference to FIGS. 14 through 17.

At 2420, the base station may transmit an indication of a difference between the first set of beamforming parameters and the refined first set of beamforming parameters to the UE. The operations of 2420 may be performed according to the methods described herein. In some examples, aspects of the operations of 2420 may be performed by a beam refinement manager as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   determining one or more channel state information parameters based at least in part on a reference signal received from a base station, wherein the reference signal corresponds to a first set of beamforming parameters and the one or more channel state information parameters are determined based at least in part on a second set of beamforming parameters that is different than the first set of beamforming parameters, wherein the second set of beamforming parameters correspond to a quasi-co-location (QCL) assumption associated with the reference signal;
   formatting a channel state information report that includes the one or more channel state information parameters; and
   transmitting the channel state information report and an indication of the second set of beamforming parameters to the base station.

2. The method of claim 1, wherein the one or more channel state information parameters are determined based at least in part on a third set of beamforming parameters, the third set of beamforming parameters determined based at least in part on a receive beam refinement procedure at the UE, and wherein the method further comprises:
   transmitting an indication of the third set of beamforming parameters to the base station.

3. The method of claim 2, wherein the indication of the second set of beamforming parameters and the indication of the third set of beamforming parameters indicate one or more of a receive beam used to receive the reference signal, a codebook assumption used to determine the one or more channel state information parameters, an indication of a difference between the second set of beamforming parameters and the third set of beamforming parameters, or any combinations thereof.

4. The method of claim 2, further comprising:
   receiving, from the base station, configuration information that configures the UE to transmit the indication of the second set of beamforming parameters and the indication of the third set of beamforming parameters.

5. The method of claim 1, wherein the indication of the second set of beamforming parameters provides QCL parameters that include one or more of QCL type A parameters, QCL type B parameters, QCL type C parameters, or QCL type D parameters.

6. The method of claim 2, wherein the indication of the third set of beamforming parameters indicates a difference in one or more of the QCL parameters relative to the second set of beamforming parameters.

7. A method for wireless communication at a base station, comprising:
   transmitting a reference signal to a user equipment (UE) using a first set of beamforming parameters;
   receiving, from the UE, a channel state information report and an indication of one or more of a second set of beamforming parameters or a third set of beamforming parameters used by the UE to determine one or more channel state information parameters that are included in the channel state information report;
   determining, based at least in part on the channel state information report and the indication, a refined first set of beamforming parameters for a data communication to the UE; and
   transmitting an indication of a difference between the first set of beamforming parameters and the refined first set of beamforming parameters to the UE.

8. The method of claim 7, wherein the second set of beamforming parameters correspond to a quasi-co-location (QCL) assumption of the UE that is associated with the reference signal, and the third set of beamforming parameters include one or more parameters determined based at least in part on a receive beam refinement procedure at the UE.

9. The method of claim 7, wherein the indication of one or more of the second set of beamforming parameters or the third set of beamforming parameters indicates one or more of a receive beam used at the UE to receive the reference signal, a codebook assumption used at the UE to determine the one or more channel state information parameters, an indication of a difference between the second set of beamforming parameters and the third set of beamforming parameters, or any combinations thereof.

10. The method of claim 7, further comprising:
    configuring, via radio resource control signaling, the UE to transmit the indication of one or more of the second set of beamforming parameters or the third set of beamforming parameters.

11. The method of claim 7, wherein the indication of the second set of beamforming parameters provides quasi-co-location (QCL) parameters that include one or more of QCL type A parameters, QCL type B parameters, QCL type C parameters, or QCL type D parameters.

12. The method of claim 11, wherein the indication of the refined first set of beamforming parameters further indicates a difference in one or more of the quasi-co-location parameters relative to the first set of beamforming parameters.

13. A method for wireless communication at a transmitting device, comprising:
    transmitting a reference signal to a receiving device using a first set of beamforming parameters determined based on a beam training procedure between the transmitting device and the receiving device;
    determining, based at least in part on a beam refinement procedure at the transmitting device, a refined set of beamforming parameters for a data communication to the receiving device; and
    transmitting an indication of a difference between the first set of beamforming parameters and the refined set of beamforming parameters to the receiving device.

14. The method of claim 13, further comprising:
    exchanging configuration information with the receiving device, the configuration information including one or more configured difference values, and wherein the indication of the difference provides an indication of the one or more configured difference values.

15. The method of claim 13, wherein the transmitting the indication of the difference comprises:
    transmitting control information associated with the data communication that includes the indication of the difference between the first set of beamforming parameters and the refined set of beamforming parameters to the receiving device.

16. The method of claim 15, wherein the transmitting device is a base station, and the control information comprises downlink control information transmitted to a user equipment.

17. The method of claim 15, wherein the transmitting device is a user equipment, and the control information comprises uplink control information transmitted to a base station.

18. The method of claim 15, wherein the control information comprises a medium access control (MAC) control element (CE) that indicates the difference between the first set of beamforming parameters and the refined set of beamforming parameters to the receiving device.

19. The method of claim 13, wherein the first set of beamforming parameters are quasi-co-location parameters and wherein the difference between the first set of beamforming parameters and the refined set of beamforming parameters comprise a difference in one or more of the quasi-co-location parameters.

20. The method of claim 19, wherein the quasi-co-location (QCL) parameters comprise one or more of QCL type A parameters, QCL type B parameters, QCL type C parameters, or QCL type D parameters.

21. The method of claim 19, wherein the difference in one or more quasi-co-location parameters comprises an explicit difference value or an implicit indication of a difference based on one or more preconfigured differences in the one or more quasi-co-location parameters.

22. The method of claim 13, further comprising:
receiving, from the receiving device, a channel state information report and an indication of a quasi-co-location assumption used to determine one or more channel state information parameters of the channel state information report, and wherein the refined set of beamforming parameters is based at least in part on the channel state information report and the indication of the quasi-co-location assumption.

23. A method for wireless communication at a receiving device, comprising:
identifying a first set of beamforming parameters determined based at least in part on a beam training procedure between a transmitting device and the receiving device;
receiving, from the transmitting device, an indication of a difference between the first set of beamforming parameters and a refined set of beamforming parameters that are used by the transmitting device for a data communication to the receiving device; and
receiving the data communication from the transmitting device based at least in part on the indicated difference between the first set of beamforming parameters and the refined set of beamforming parameters.

24. The method of claim 23, further comprising:
exchanging configuration information with the transmitting device, the configuration information including one or more configured difference values, and wherein the indicated difference between the first set of beamforming parameters and the refined set of beamforming parameters is an indication of the one or more configured difference values.

25. The method of claim 23, wherein the receiving the indication of the difference comprises:
receiving control information associated with the data communication that includes the indication of the difference between the first set of beamforming parameters and the refined set of beamforming parameters to the receiving device.

26. The method of claim 25, wherein the receiving device is a user equipment, and the control information comprises downlink control information transmitted to the user equipment.

27. The method of claim 25, wherein the receiving device is a base station, and the control information comprises uplink control information transmitted to the base station from a user equipment.

28. The method of claim 25, wherein the control information comprises a medium access control (MAC) control element (CE) that indicates the difference between the first set of beamforming parameters and the refined set of beamforming parameters to the receiving device.

29. The method of claim 23, wherein the first set of beamforming parameters are quasi-co-location parameters and wherein the difference between the first set of beamforming parameters and the refined set of beamforming parameters comprise a difference in one or more of the quasi-co-location parameters.

30. The method of claim 29, wherein the difference in one or more quasi-co-location parameters comprises an explicit difference value or an implicit indication of a difference based on one or more preconfigured differences in the one or more quasi-co-location parameters.

\* \* \* \* \*